(12) United States Patent
Schrodi et al.

(10) Patent No.: US 12,440,831 B2
(45) Date of Patent: Oct. 14, 2025

(54) LONGER-LIVED RUTHENIUM OLEFIN METATHESIS CATALYSTS SUPPORTED BY HEMI-LABILE CARBENE LIGANDS

(71) Applicant: The California State University—Northridge, Northridge, CA (US)

(72) Inventors: Yann Schrodi, Northridge, CA (US); Nicolas Cena, Northridge, CA (US); Joseph Yoon, Northridge, CA (US)

(73) Assignee: The Trustees of the California State University, Long Beach, CA (US)

( * ) Notice: Subject to any disclaimer, the term of this patent is extended or adjusted under 35 U.S.C. 154(b) by 437 days.

(21) Appl. No.: 17/096,001

(22) Filed: Nov. 12, 2020

(65) Prior Publication Data

US 2021/0138444 A1 May 13, 2021

Related U.S. Application Data

(60) Provisional application No. 62/933,756, filed on Nov. 11, 2019.

(51) Int. Cl.
*C07D 233/22* (2006.01)
*B01J 23/46* (2006.01)
(Continued)

(52) U.S. Cl.
CPC ....... *B01J 31/2278* (2013.01); *B01J 31/2208* (2013.01); *C07C 6/04* (2013.01);
(Continued)

(58) Field of Classification Search
CPC ................ B01J 31/2278; B01J 31/2208; B01J 2231/543; B01J 2531/004; B01J 2531/821;
(Continued)

(56) References Cited

U.S. PATENT DOCUMENTS 9,238,709 B2 * 1/2016 Ung .................. C08G 61/02

OTHER PUBLICATIONS

CAS Registry No. 2410938-83-7, Mar. 2020.*

* cited by examiner

*Primary Examiner* — Matthew P Coughlin
*Assistant Examiner* — Ashli Ariana Chicks
(74) *Attorney, Agent, or Firm* — Sandra Poteat Thompson; Finlayson Toffer LLP

(57) ABSTRACT

Contemplated subject matter disclosed herein relates generally to organometallic olefin metathesis catalysts, and more particularly to longer-lived olefin metathesis catalysts supported by hemi-labile carbene ligands that bear an arm with one or more donor ligands, as well as the use of such catalysts in metathesis reactions of olefins and olefin compounds. The contemplated subject matter has utility in the fields of catalysis, organic synthesis, polymer chemistry, and industrial and fine chemicals chemistry. This contemplated subject matter serves to reduce the cost of olefin metathesis (OM) processes including in olefin metathesis polymerizations, conversion of vegetable oils into chemicals, and processes in the petrochemical industry. This contemplated subject matter reduces the cost of OM processes by providing OM catalysts that are longer-lived and lead to higher turnover numbers, hence requiring less catalyst to convert a given amount of substrate(s). Considering that the OM catalyst is the most expensive part of some OM processes, longer-lived OM catalysts have the benefit of reducing the overall cost of the OM processes.

2 Claims, 9 Drawing Sheets

(51) Int. Cl.
*B01J 31/22* (2006.01)
*C07C 6/04* (2006.01)
*C07C 67/293* (2006.01)
*C07F 15/00* (2006.01)
*C08G 61/08* (2006.01)

(52) U.S. Cl.
CPC .......... *C07C 67/293* (2013.01); *C07D 233/22* (2013.01); *C07F 15/0046* (2013.01); *C08G 61/08* (2013.01); *B01J 2231/543* (2013.01); *B01J 2531/004* (2013.01); *B01J 2531/821* (2013.01); *C07C 2531/22* (2013.01); *C08G 2261/3323* (2013.01); *C08G 2261/418* (2013.01)

(58) Field of Classification Search
CPC ..... C07C 6/04; C07C 67/293; C07C 2531/22; C07D 233/22; C07F 15/0046; C08G 61/08; C08G 2261/418; C08G 2261/3323
See application file for complete search history.

Prior Art Figure 1

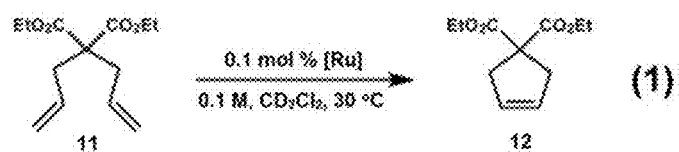
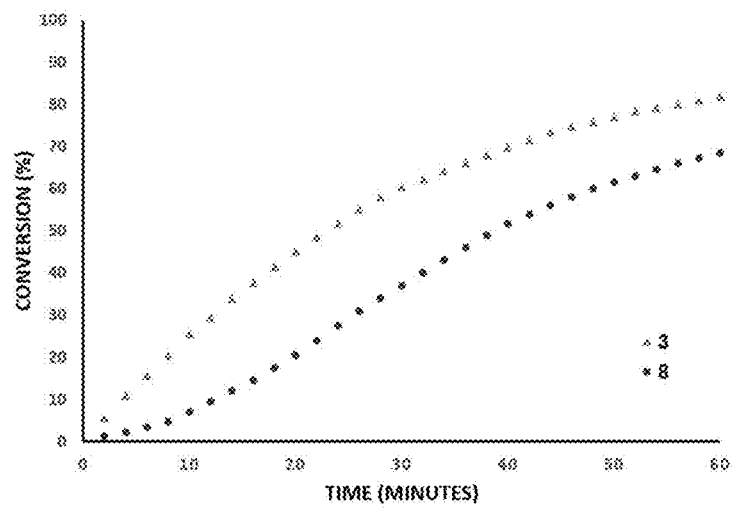
Figure 2

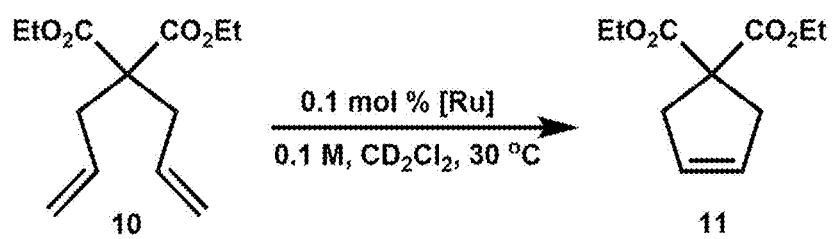
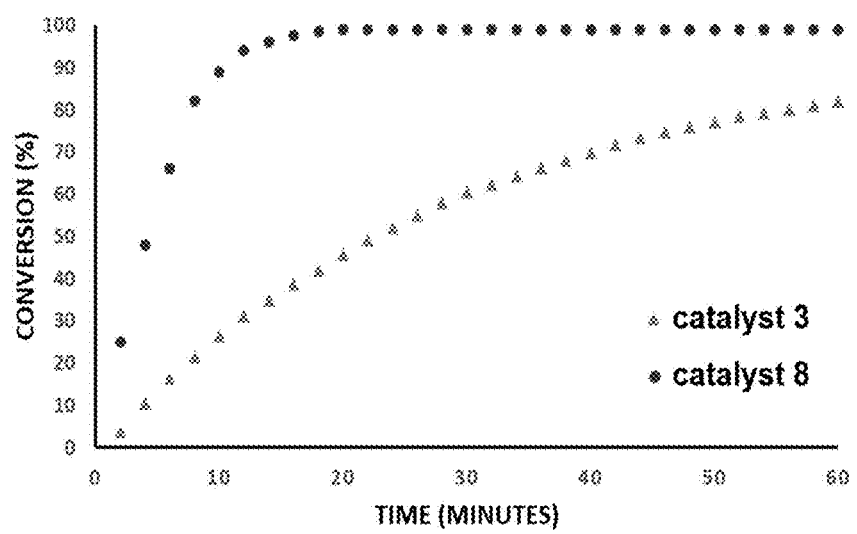
Figure 3

LONGER-LIVED RUTHENIUM OLEFIN METATHESIS CATALYSTS SUPPORTED BY HEMI-LABILE CARBENE LIGANDS

This United States Utility application claims priority to U.S. Provisional Patent Application No. 62/933,756, which was filed on Nov. 11, 2019, is commonly owned, and is incorporated herein in its entirety by reference.

GOVERNMENT RIGHTS STATEMENT

This invention was made with government support under Contract No.: 2SC3GM-098217 awarded by the National Institutes of Health (NIH). The government has certain rights in the invention.

BACKGROUND

Olefin metathesis has greatly impacted the field of modern organic synthesis. The reaction is promoted by metal alkylidene complexes such as the Schrock, Grubbs, and Hoveyda catalysts. The Grubbs and Hoveyda systems (Prior Art FIG. 1) in particular have been widely used by synthetic chemists because they can be handled in the air and are tolerant of various functional groups. This family of homogenous ruthenium catalysts finds numerous applications, including some in the petroleum industry and the conversion of seed oils into useful chemicals. For large-scale industrial processes, the catalyst's maximum TON become an important consideration, as they are tied to economic feasibility. Maximum TON for the Grubbs and Hoveyda catalysts tend to hover around 10,000 to 500,000 depending on the type of metathesis reaction (such as RCM vs. ROMP) and the conditions (such as temperature, solvent, purity, and exclusion of air). This patent application will discuss the production and use of longer-lived systems by curtailing catalyst decomposition.

The decomposition of olefin metathesis catalysts has been the subject of extensive research. Grubbs catalysts bearing substituted alkylidene ligands, [Ru]=CHR where R=alkyl or aryl, were shown to undergo bimolecular decomposition forming RCH=CHR by dimerization of the 14-electron [Ru]=CHR species. Methylidene intermediates, LRu(=CH$_2$)(Cl)$_2$(PCy$_3$), which are the catalyst's resting state in metatheses involving ethylene and terminal alkenes, decay primarily by a unimolecular pathway involving the attack of a phosphine ligand on the methylidene fragment (Ru=CH$_2$). The 2$^{nd}$ generation Hoveyda catalyst, which does not possess any phosphines, decomposes by a different pathway in the presence of ethylene or terminal alkenes. However, the decomposition mechanisms for these systems are not well understood. The isopropoxy benzylidene fragment is lost upon the 1$^{st}$ cycle of metathesis to generate highly reactive species (such as the 4-coordinate 14-electron methylidene and metallacyclobutane intermediates.) These species are vulnerable to decomposition reactions which provide the metal with additional electron density such as C—H activation, p-hydride elimination, and dimerization through bridging halogens.

Olefin metathesis is a well-documented method for the formation of carbon-carbon bonds in organic synthesis and polymer synthesis. The most commonly used olefin metathesis catalysts are the ruthenium olefin metathesis catalysts developed by Herrmann, Grubbs, and Hoveyda. However, the relatively low turnover numbers achieved by these catalysts can be a limiting factor in the commercial viability of some olefin metathesis processes. Therefore, longer-lived olefin metathesis catalysts, that give greater turnover numbers than the state-of-the-art catalysts, are highly desirable. Additionally, it can be advantageous, especially in polymerization reactions, if the olefin metathesis catalysts initiate relatively slowly, so as to provide mixing time and/or working time before the polymerization mixtures start to gel or harden.

Accordingly, the contemplated subject matter is directed at addressing one or more of the aforementioned limitations, and, in one embodiment, provides a composition for longer-lived and/or slow-initiating olefin metathesis catalysts comprising a ruthenium center supported by hemi-labile carbene ligands that bear one or more arms that each contain one or more additional neutral ligands.

SUMMARY OF THE SUBJECT MATTER

Contemplated ruthenium olefin metathesis catalysts comprise the formula:

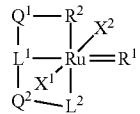

wherein L$^1$ and L$^2$ are neutral electron donors; X$^1$ and X$^2$ are anionic ligands; R$^1$ comprises alkylidene ligand, vinylidene ligand, allenylidene ligand, or indenylidene ligand; R$^2$ is a carbene ligand; and Q$^1$ and Q$^2$ comprise hydrocarbylene, substituted hydrocarbylene, heteroatom-containing hydrocarbylene, or substituted heteroatom-containing hydrocarbylene. In some embodiments, R$^1$ is selected from an alkylidene ligand, a vinylidene ligand, an allenylidene ligand, or an indenylidene ligand. In other embodiments, Q$^1$ and Q$^2$ are independently selected from hydrocarbylene, substituted hydrocarbylene, heteroatom-containing hydrocarbylene, or substituted heteroatom-containing hydrocarbylene.

Other contemplated ruthenium olefin metathesis catalysts comprise the formula:

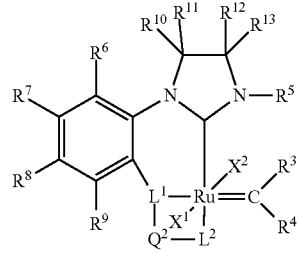

wherein L$^1$ and L$^2$ are neutral electron donors, wherein L$^2$ is not oxygen; X$^1$ and X$^2$ are anionic ligands; R$^3$, R$^4$, R$^5$, R$^6$, R$^7$, R$^8$, R$^9$, R$^{10}$, R$^{11}$, R$^{12}$, and R$^{13}$ are independently selected from hydrogen, functional groups, hydrocarbyl, substituted hydrocarbyl, heteroatom-containing hydrocarbyl, or substituted heteroatom-containing hydrocarbyl; and Q$^2$ is selected from hydrocarbylene, substituted hydrocarbylene, heteroatom-containing hydrocarbylene, or substituted heteroatom-containing hydrocarbylene. In some embodiments L$^1$ is an oxygen atom; L$^2$ is selected from a pyridyl ligand and substituted pyridyl ligands; X$^1$ and X$^2$ are anionic ligands; R$^3$, R$^4$, R$^5$, R$^6$, R$^7$, R$^8$, R$^9$, R$^{10}$, R$^{11}$, R$^{12}$, and R$^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from ethylene (—$CH_2$—$CH_2$—), substituted ethylene, or phenylene.

Contemplated carbene compound precursors comprise the formula:

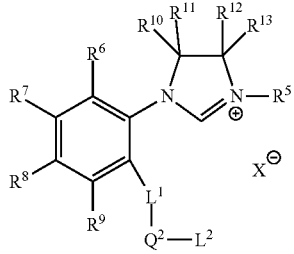

wherein $L^1$ and $L^2$ are neutral electron donors; in a preferred embodiment, $L^2$ is selected from a pyridyl ligand and substituted pyridyl ligands; $X^-$ is an anion; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene. In some embodiments, contemplated ruthenium olefin metathesis catalysts are formed by utilizing contemplated carbene precursors.

Contemplated carbene compound precursors comprise the formula:

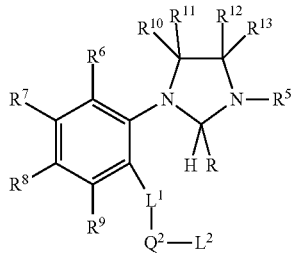

wherein $L^1$ and $L^2$ are neutral electron donors; R is hydrocarbyl, substituted hydrocarbyl, heteroatom-containing hydrocarbyl, and substituted heteroatom-containing hydrocarbyl; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene. In some embodiments, $L^2$ is selected from the group including pyridyl ligand and substituted pyridyl ligands. In some embodiments, contemplated ruthenium olefin metathesis catalysts are formed by utilizing contemplated carbene precursors.

Contemplated carbene compound precursors comprise the formula:

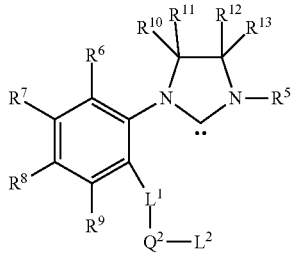

wherein $L^1$ and $L^2$ are neutral electron donors; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene. In some embodiments, $L^2$ is selected from the group including pyridyl ligand and substituted pyridyl ligands. In some embodiments, contemplated ruthenium olefin metathesis catalysts are formed by utilizing contemplated carbene precursors.

BRIEF DESCRIPTION OF THE FIGURES

Prior Art

FIG. 2 shows RCM activity of catalysts 3 and 8.

A graph which compares catalysts 3 and 8 at performing the RCM of DEDAM 10 into cycloalkene 11 is shown in FIG. 3.

Figure 4:
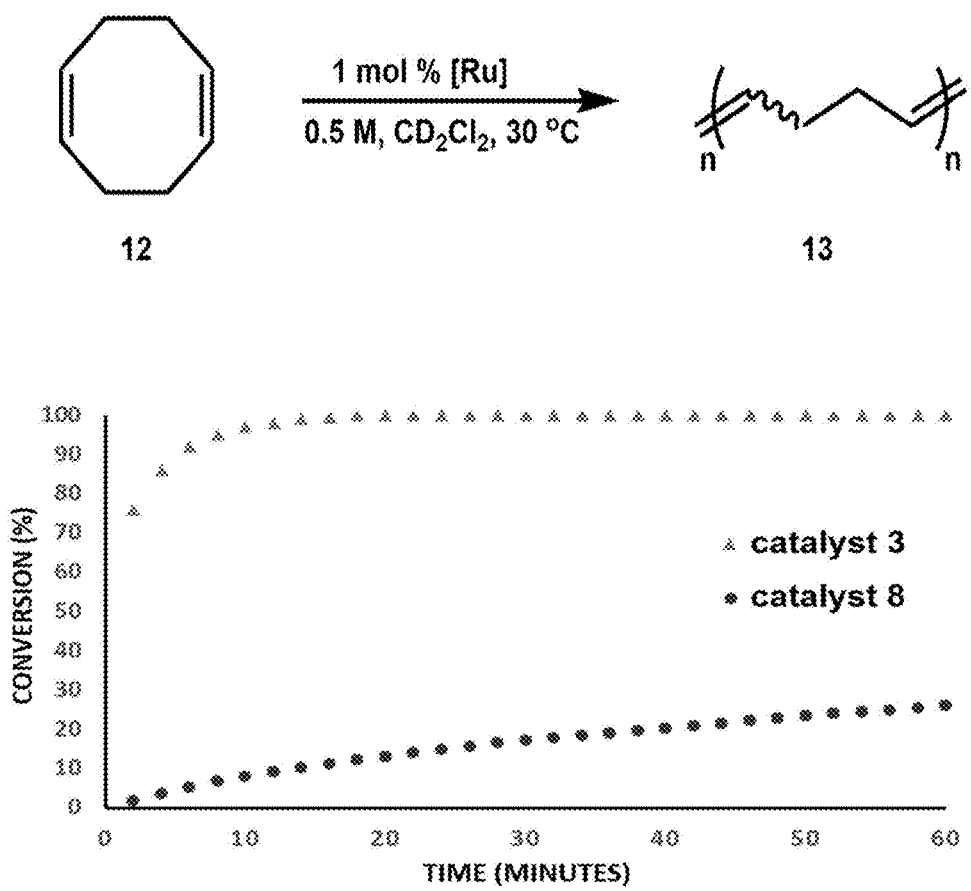

A very different situation is illustrated by the graph below which compares catalysts 3 and 8 at performing the ROMP of COD 12 into polymer 13, as shown in FIG. 4.

Figure 5:
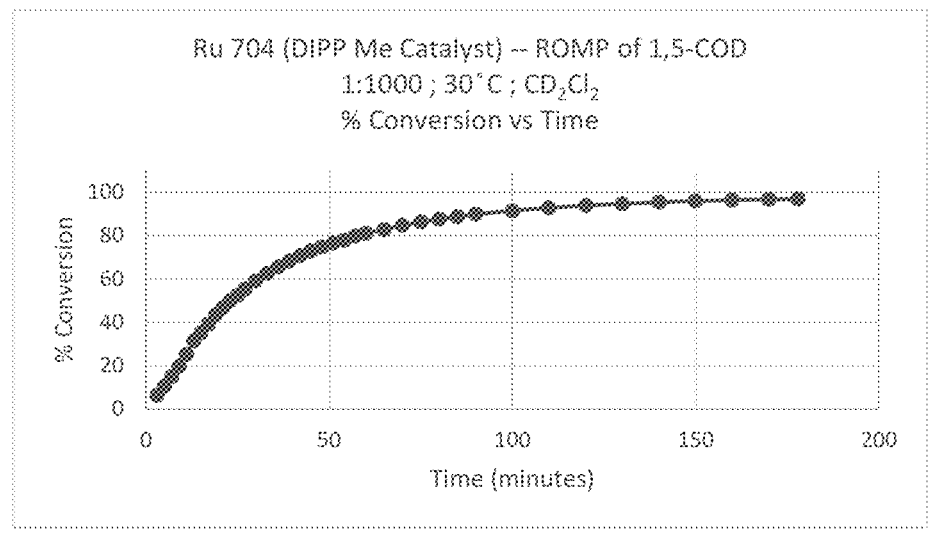

FIG. 5 shows ROMP of COD kinetic plot with Ru 704 catalyst at 1,000 equiv. of substrate and 30° C.

Figure 6:
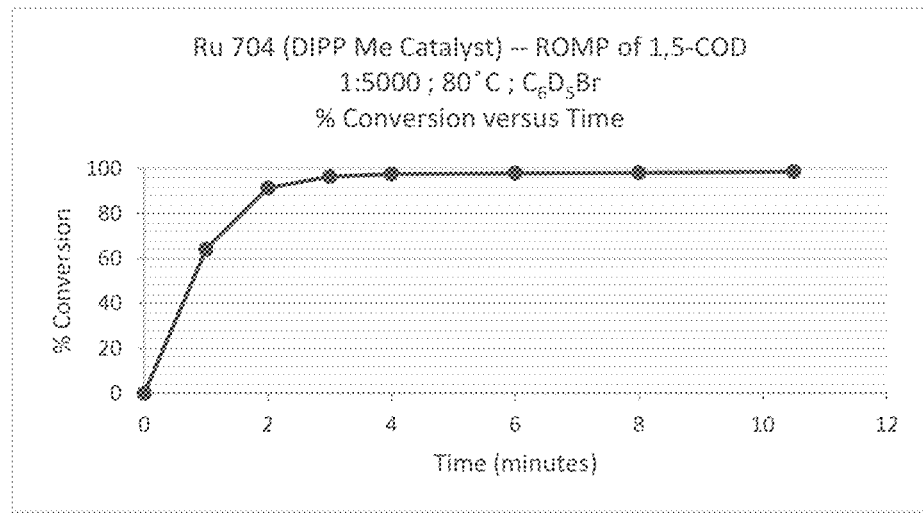

FIG. 6 shows ROMP of COD kinetic plot with Ru 704 catalyst at 5,000 equiv. of substrate and 80° C.

Figure 7:
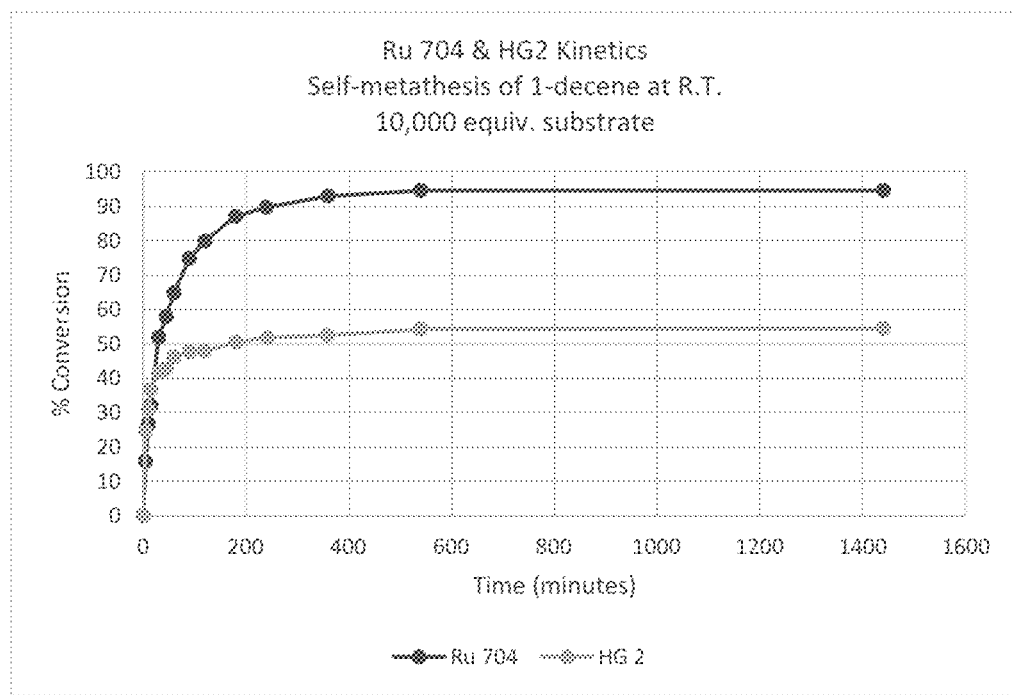

FIG. 7 shows SM of 1-decene kinetic plots of Ru 704 and HG2 catalysts at room temperature.

Figure 8:
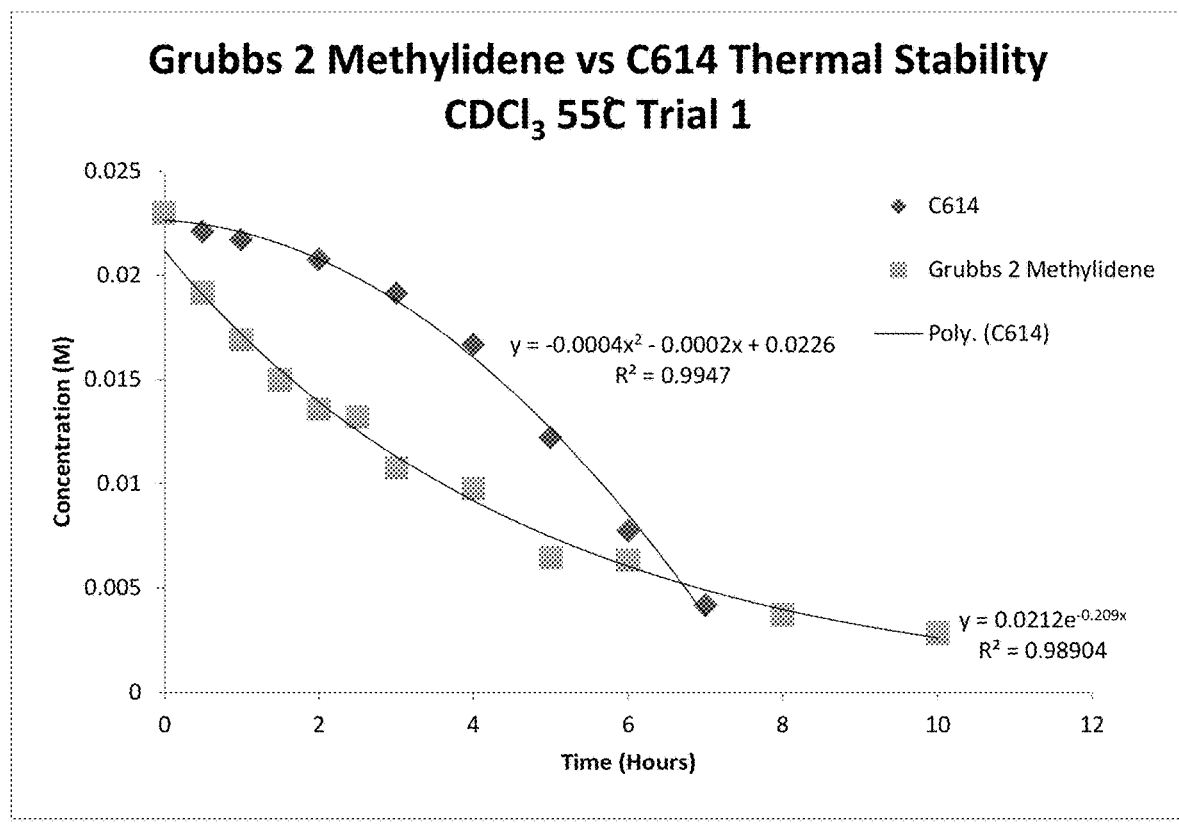

FIG. 8 shows a representation of the data in Table 10.

Figure 9:
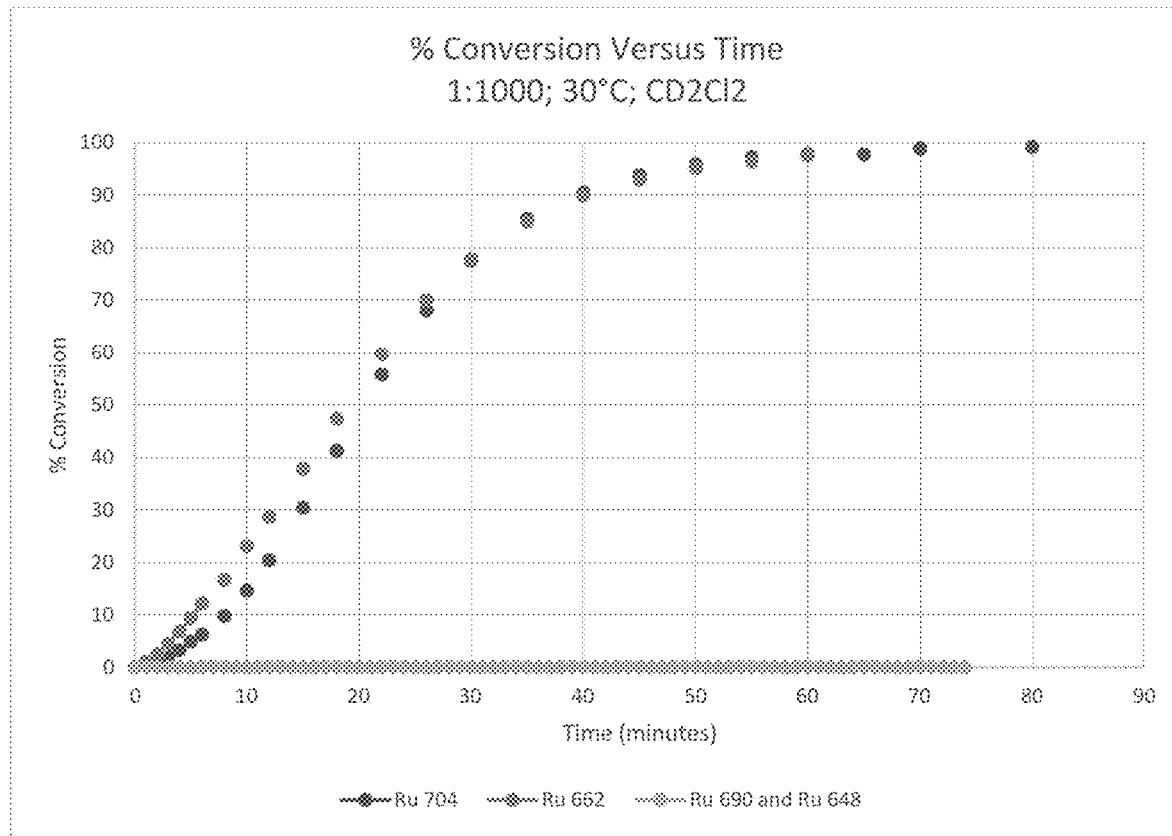

FIG. 9 shows a representation of the data in Table 10.

Figure 10:
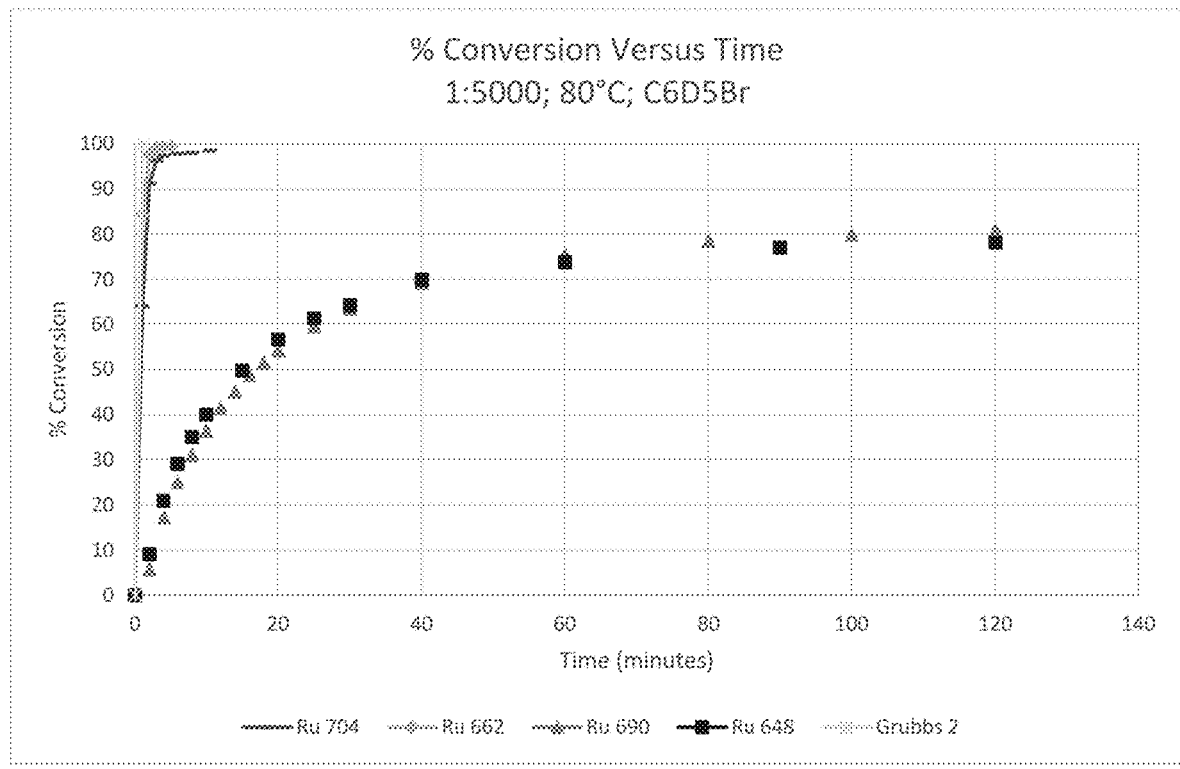

FIG. 10 shows a representation of the data in Table 10.

Figure 11:
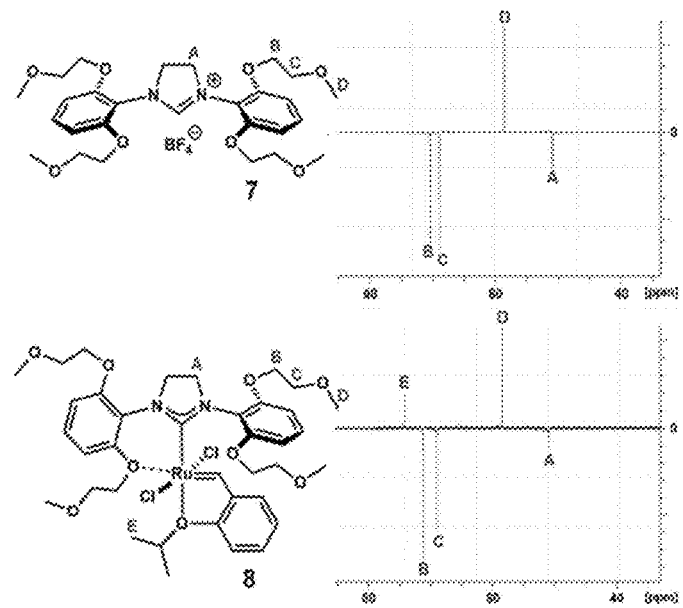

FIG. 11 shows the extent of 8→9 conversion can be quantified by comparing the integrations of alkylidene protons in the $^1$H NMR spectra ($C_6D_6$): 18.15 ppm for catalyst 8 and 15.77 ppm for dinuclear compound 9.

DETAILED DESCRIPTION

Contemplated subject matter disclosed herein relates generally to organometallic olefin metathesis catalysts, and more particularly to longer-lived olefin metathesis catalysts supported by hemi-labile carbene ligands that bear an arm with one or more donor ligands, as well as the use of such catalysts in metathesis reactions of olefins and olefin compounds. The contemplated subject matter has utility in the fields of catalysis, organic synthesis, polymer chemistry, and industrial and fine chemicals chemistry.

This contemplated subject matter serves to reduce the cost of olefin metathesis (OM) processes including in olefin metathesis polymerizations, conversion of vegetable oils into chemicals, and processes in the petrochemical industry.

This contemplated subject matter reduces the cost of OM processes by providing OM catalysts that are longer-lived and lead to higher turnover numbers, hence requiring less catalyst to convert a given amount of substrate(s). Considering that the OM catalyst is the most expensive part of some OM processes, longer-lived OM catalysts have the benefit of reducing the overall cost of the OM processes.

Some examples of OM processes that may benefit from this contemplated subject matter are the following:
1. alkenolysis of internal olefins (i.e., the production of terminal alkenes by reacting internal alkenes with readily available terminal alkenes such as ethylene, propylene, 1-hexene) including the alkenolysis of alkenes derived from vegetable oils and from the Fischer-Tropsch Process;
2. olefin metathesis including cross-metathesis of alkenes derived from the petroleum industry;
3. olefin polymerization processes including ring-opening metathesis polymerization (ROMP) and acyclic diene metathesis (ADMET) polymerization.

Additionally, the contemplated subject matter relates to the hemi-labile carbene ligands that bear an arm with one or more donor ligands, and to their precursors.

In general, the contemplated subject matter relates to ruthenium olefin metathesis catalysts of the formula (I) below:

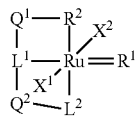

wherein $L^1$ and $L^2$ are neutral electron donors; $X^1$ and $X^2$ are anionic ligands; $R^1$ is selected from alkylidene ligand, vinylidene ligand, allenylidene ligand, or indenylidene ligand; $R^2$ is a carbene ligand; $Q^1$ and $Q^2$ are independently selected from hydrocarbylene, substituted hydrocarbylene, heteroatom-containing hydrocarbylene, or substituted heteroatom-containing hydrocarbylene.

In a contemplated embodiment, the contemplated subject matter relates to ruthenium olefin metathesis catalysts of the formula (II) below:

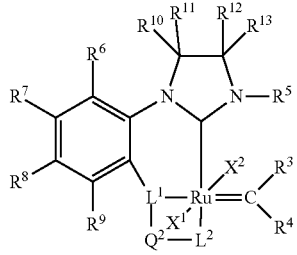

wherein $L^1$ and $L^2$ are neutral electron donors, wherein $L^2$ is not oxygen; $X^1$ and $X^2$ are anionic ligands; $R^3$, $R^4$, $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene.

In another contemplated embodiment, ruthenium olefin metathesis catalysts may comprise the formula (II) wherein: $L^1$ is an oxygen atom; $L^2$ is selected from a pyridyl ligand and substituted pyridyl ligands; $X^1$ and $X^2$ are anionic ligands; $R^3$, $R^4$, $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, substituted heteroatom-containing hydrocarbyl; and $Q^2$ is selected from ethylene (—CH$_2$—CH$_2$—), substituted ethylene, and phenylene.

Another contemplated embodiment includes precursors of carbene compounds of the formula (III) below:

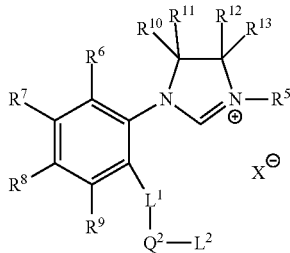

wherein $L^1$ and $L^2$ are neutral electron donors; in a preferred embodiment, $L^2$ is selected from a pyridyl ligand and substituted pyridyl ligands; $X^-$ is an anion; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, and substituted heteroatom-containing hydrocarbylene. These precursors can be utilized in the synthesis and formation of contemplated ruthenium olefin metathesis catalysts.

In yet another aspect, contemplated synthesis precursors include carbene compounds of the formula (IV) below, wherein $L^1$ and $L^2$ are neutral electron donors; in a preferred embodiment, $L^2$ is selected from a pyridyl ligand and substituted pyridyl ligands; R is hydrocarbyl, substituted hydrocarbyl, heteroatom-containing hydrocarbyl, and substituted heteroatom-containing hydrocarbyl; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, and substituted heteroatom-containing hydrocarbyl; and $Q^2$ is selected from hydrocarbylene, substituted hydrocarbylene, heteroatom-containing hydrocarbylene, and substituted heteroatom-containing hydrocarbylene.

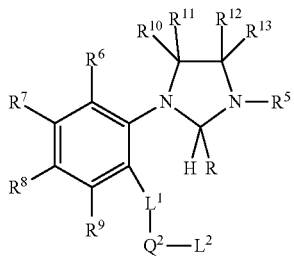

In a further aspect, the contemplated subject matter relates to carbene compounds of the formula (V) wherein $L^1$ and $L^2$ are neutral electron donors; in a preferred embodiment, $L^2$ is selected from a pyridyl ligand and substituted pyridyl ligands; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, and substituted heteroatom-containing hydrocarbyl; and $Q^2$ is selected from hydrocarbylene, substituted hydrocarbylene, heteroatom-containing hydrocarbylene, and substituted heteroatom-containing hydrocarbylene.

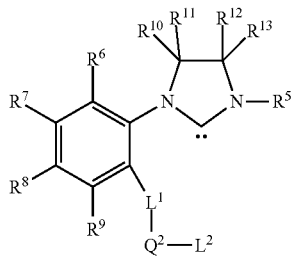

Specifically, contemplated ruthenium olefin metathesis catalysts comprise the formula:

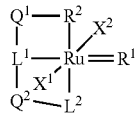

wherein $L^1$ and $L^2$ are neutral electron donors; $X^1$ and $X^2$ are anionic ligands; $R^1$ comprises alkylidene ligand, vinylidene ligand, allenylidene ligand, or indenylidene ligand; $R^2$ is a carbene ligand; and $Q^1$ and $Q^2$ comprise hydrocarbylene, substituted hydrocarbylene, heteroatom-containing hydrocarbylene, or substituted heteroatom-containing hydrocarbylene. In some embodiments, $R^1$ is selected from an alkylidene ligand, a vinylidene ligand, an allenylidene ligand, or an indenylidene ligand. In other embodiments, $Q^1$ and $Q^2$ are independently selected from hydrocarbylene, substituted hydrocarbylene, heteroatom-containing hydrocarbylene, or substituted heteroatom-containing hydrocarbylene.

Other contemplated ruthenium olefin metathesis catalysts comprise the formula:

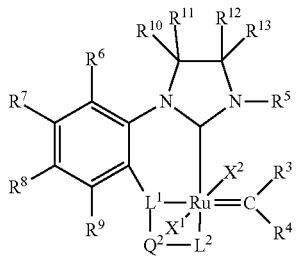

wherein $L^1$ and $L^2$ are neutral electron donors, wherein $L^2$ is not oxygen; $X^1$ and $X^2$ are anionic ligands; $R^3$, $R^4$, $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene. In some embodiments $L^1$ is an oxygen atom; $L^2$ is selected from a pyridyl ligand and substituted pyridyl ligands; $X^1$ and $X^2$ are anionic ligands; $R^3$, $R^4$, $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from ethylene (—$CH_2$—$CH_2$—), substituted ethylene, or phenylene.

Contemplated carbene compound precursors comprise the formula:

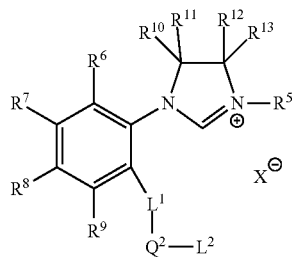

wherein $L^1$ and $L^2$ are neutral electron donors; in a preferred embodiment, $L^2$ is selected from a pyridyl ligand and substituted pyridyl ligands; $X^-$ is an anion; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene. In some embodiments, contemplated ruthenium olefin metathesis catalysts are formed by utilizing contemplated carbene precursors.

Contemplated carbene compound precursors comprise the formula:

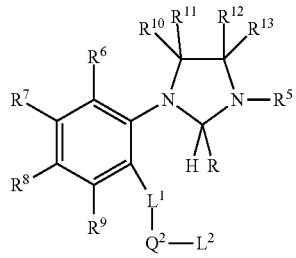

wherein $L^1$ and $L^2$ are neutral electron donors; R is hydrocarbyl, substituted hydrocarbyl, heteroatom-containing hydrocarbyl, and substituted heteroatom-containing hydrocarbyl; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene. In some embodiments, $L^2$ is selected from the group including pyridyl ligand and substituted pyridyl ligands. In some embodiments, contemplated ruthenium olefin metathesis catalysts are formed by utilizing contemplated carbene precursors.

Contemplated carbene compound precursors comprise the formula:

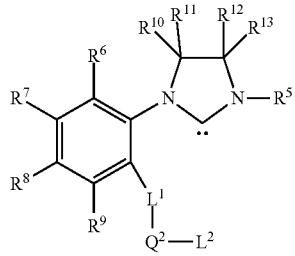

wherein $L^1$ and $L^2$ are neutral electron donors; $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from hydrocarbylene, substituted hydrocarbylene, heteroatom-containing hydrocarbylene, or substituted heteroatom-containing hydrocarbylene. In some embodiments, $L^2$ is selected from the group including pyridyl ligand and substituted pyridyl ligands. In some embodiments, contemplated ruthenium olefin metathesis catalysts are formed by utilizing contemplated carbene precursors.

Some conventional ligands that can be compared with those that are contemplated embodiments are found below:

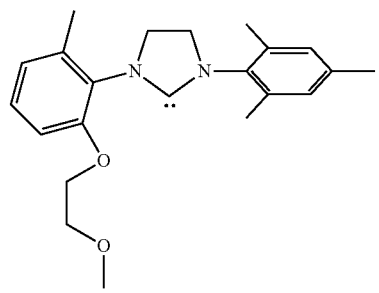

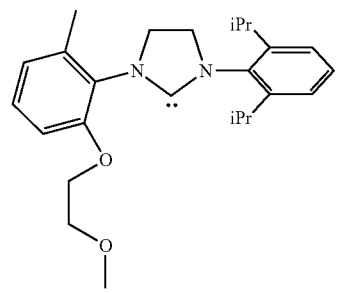

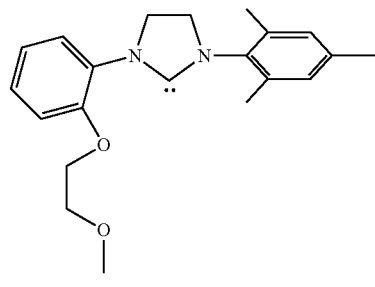

-continued

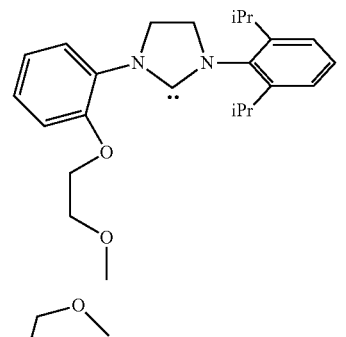

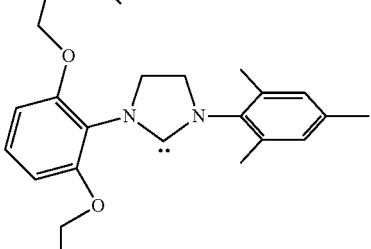

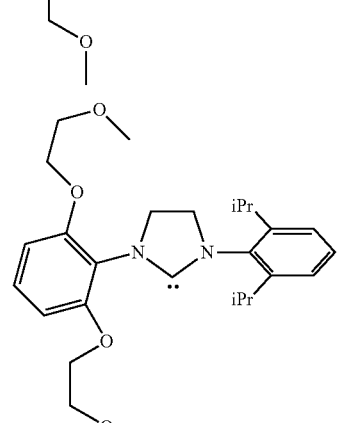

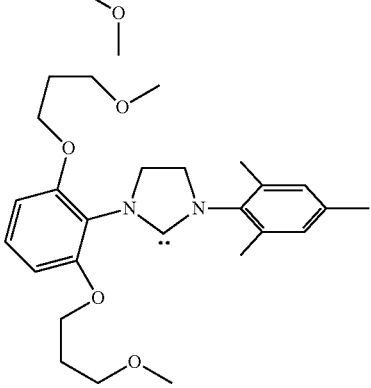

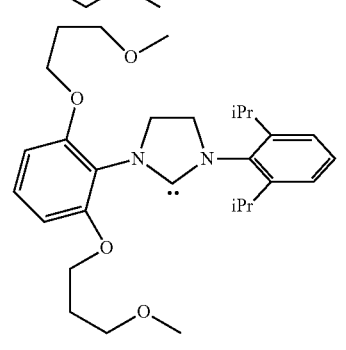

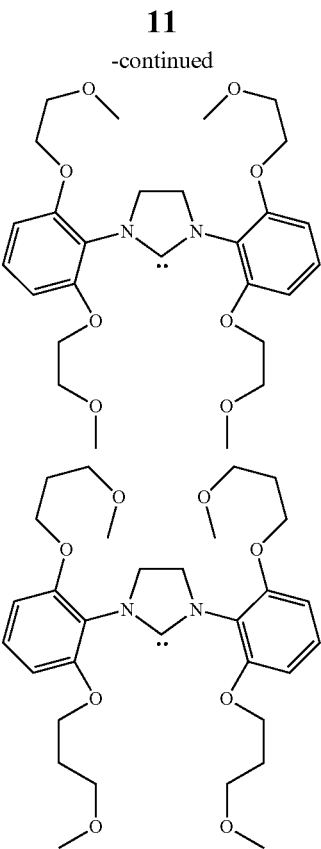
As a comparative to the ones above, examples of contemplated carbene ligands prepared according to the subject matter herein include:
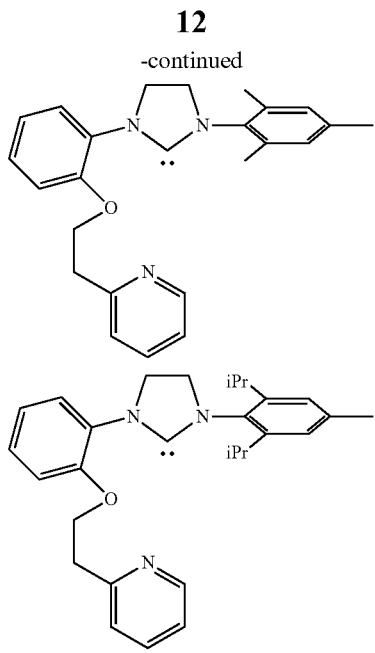
Other examples of possible carbene ligands, include:
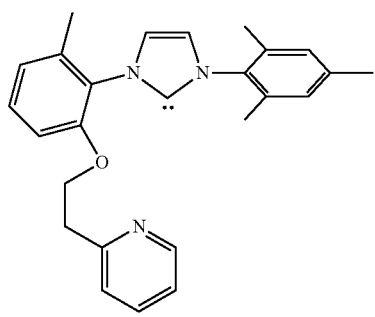
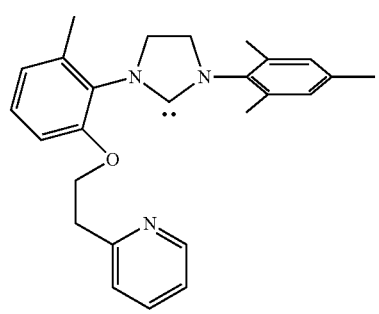
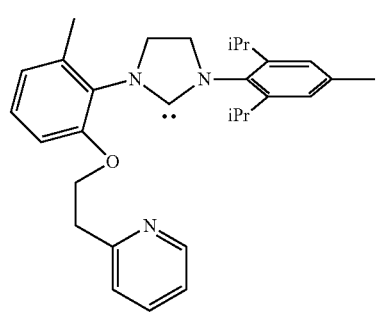
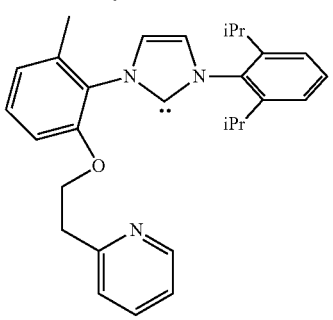
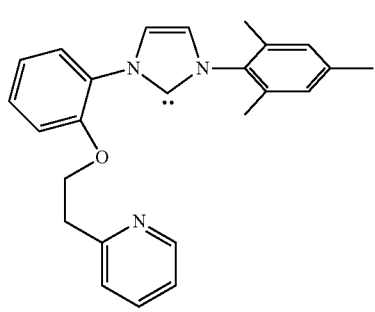

-continued
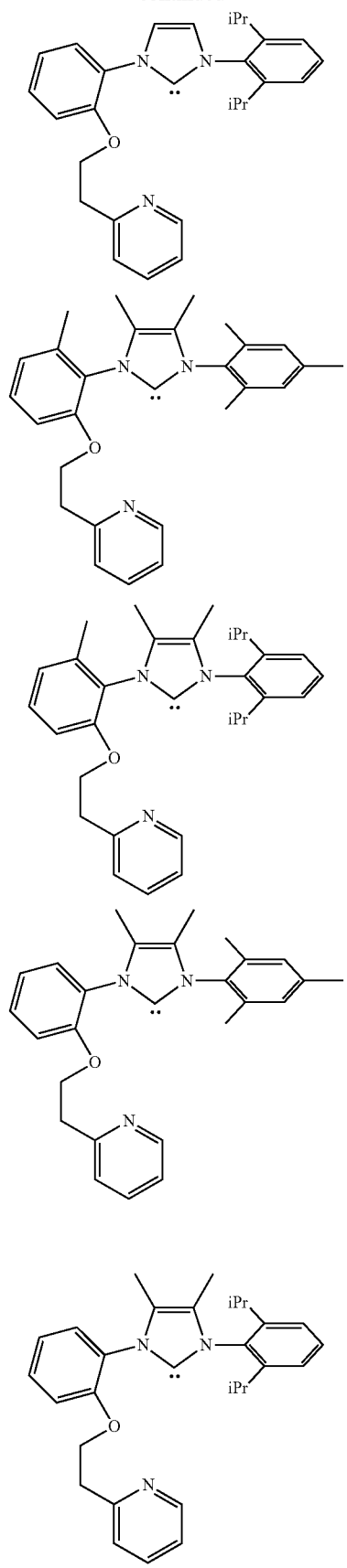

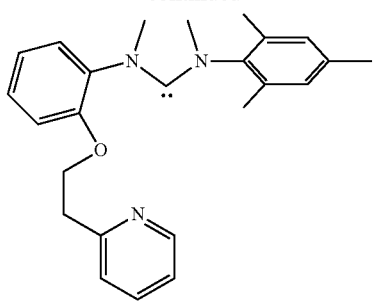

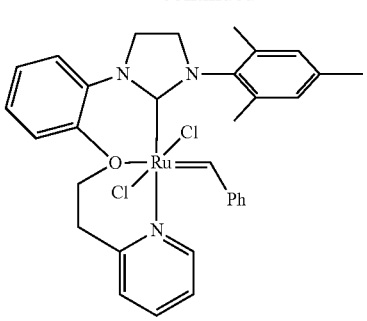

C648

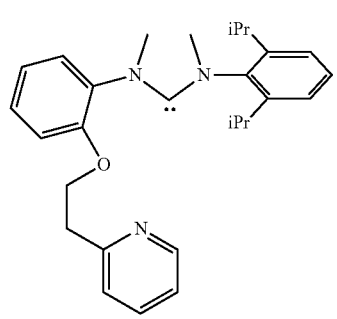

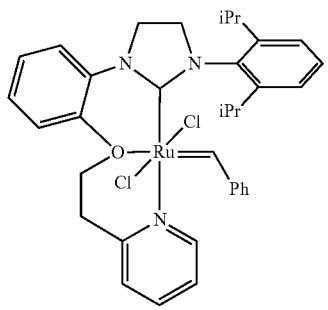

C690

SPECIFIC EXAMPLES OF CONTEMPLATED
OLEFIN METATHESIS CATALYSTS

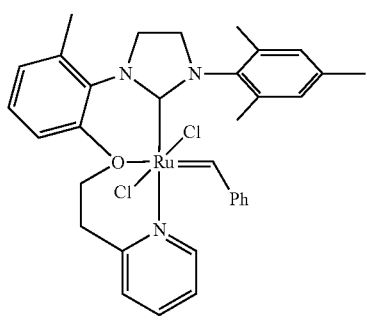

C662

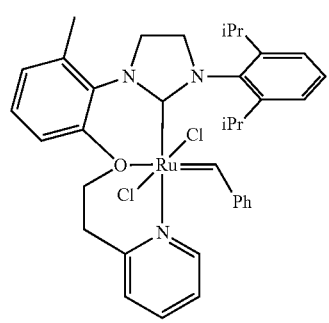

C704

C613

The following examples and experimental information provide clear routes of synthesis and compares contemplated compounds with conventional compounds known in the art. These examples should not be considered limiting, but instead are showing representative syntheses and compounds that allow one of ordinary skill in the art to use contemplated embodiments.

Examples and Experimental Procedures

Figure 1:
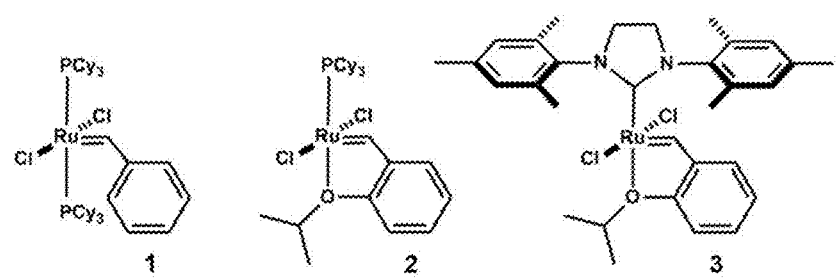
FIG. 1 shows the Grubbs and Hoveyda systems that have been widely used by synthetic chemists because they can be handled in the air and are tolerant of various functional groups.

Example 1: Conventional Embodiments: Stabilization of a Second-Generation Olefin Metathesis Active Catalyst Species by O—Ru—O Chelation In this conventional embodiment, a long-lived catalyst which could achieve significantly higher TON than 3 (shown in Prior Art FIG. 1) was developed. The strategy was to functionalize the NHC with hemi-labile polyether arms. These were intended to coordinate with Ru and potentially even wrap around the metal via chelation, thus providing electron density and steric protection to Ru.

In this example, the synthesis, structural analysis, decomposition, and activity of catalyst 8 is shown. The straightforward synthesis is illustrated by the 4-step reaction sequence shown below:

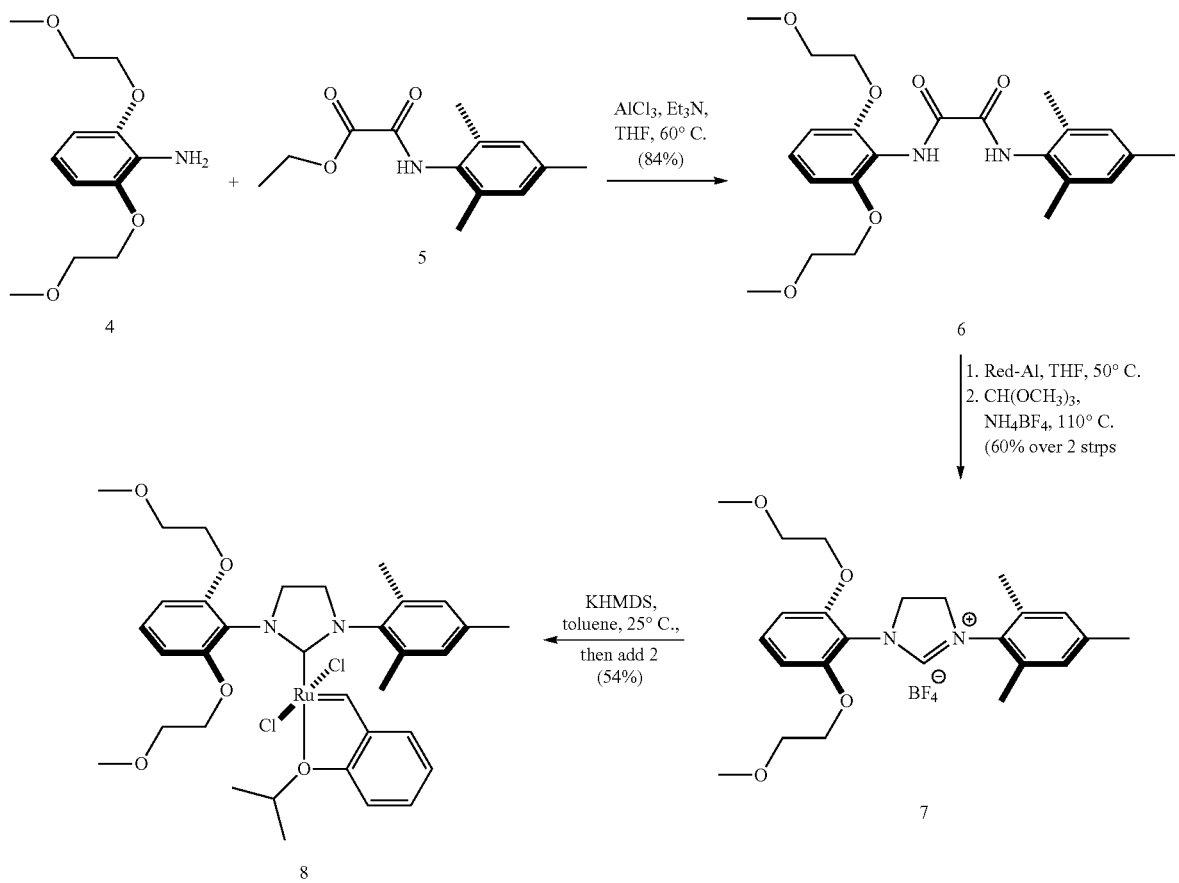

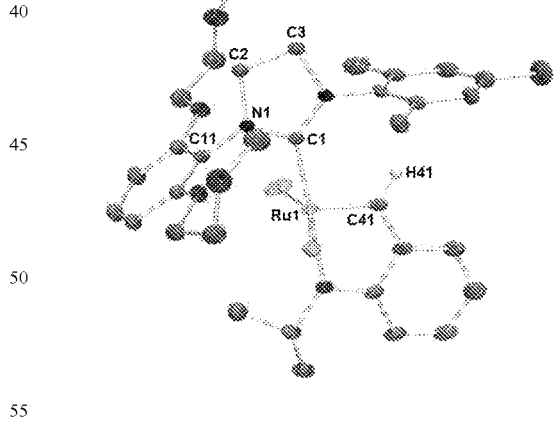

Crystal structure of imidazolinium 7. Thermal ellipsoids at 50% probability. BF4⁻ anion and all hydrogen atoms except for H1 omitted for clarity:

Crystal structure of catalyst 8. Thermal ellipsoids at 50% probability. All hydrogen atoms except for H41 omitted for clarity:

The crystal structures of imidazolinium 7 shown and the corresponding catalyst 8 shown reveal that the conformation adopted by the NHC ligand does not change significantly upon attachment to Ru. In both compounds, the aromatic rings of the NHC are nearly perpendicular to the NHC heterocycle. The geometry of catalyst 8 is very similar to the default geometry of the commercial catalyst 3. This differs from the conformation of a tetra-substituted catalyst reported by our group in a previous communication. The lack of conformational change away from the default position is likely due to the absence of steric repulsion between the two halves of the NHC and the lack of any O→Ru interactions.

Although the crystal structure of catalyst 8 does not display O→Ru coordination, this does not necessarily mean that the 14-electron active catalyst species formed upon initiation of the 16-electron pre-catalyst is incapable of coordinating while in solution. In order to mimic the metal center of the 14-electron active catalyst species, our strategy was to transform the catalyst into an isoelectronic species which could then be captured and analyzed by x-ray crystallography. Two products were obtained: Fischer carbene 9 formed by reacting the catalyst with ethyl vinyl ether (EVE), and degradation product 10 formed by decomposing the catalyst in the presence of excess 1-hexene. These two reactions are shown below:

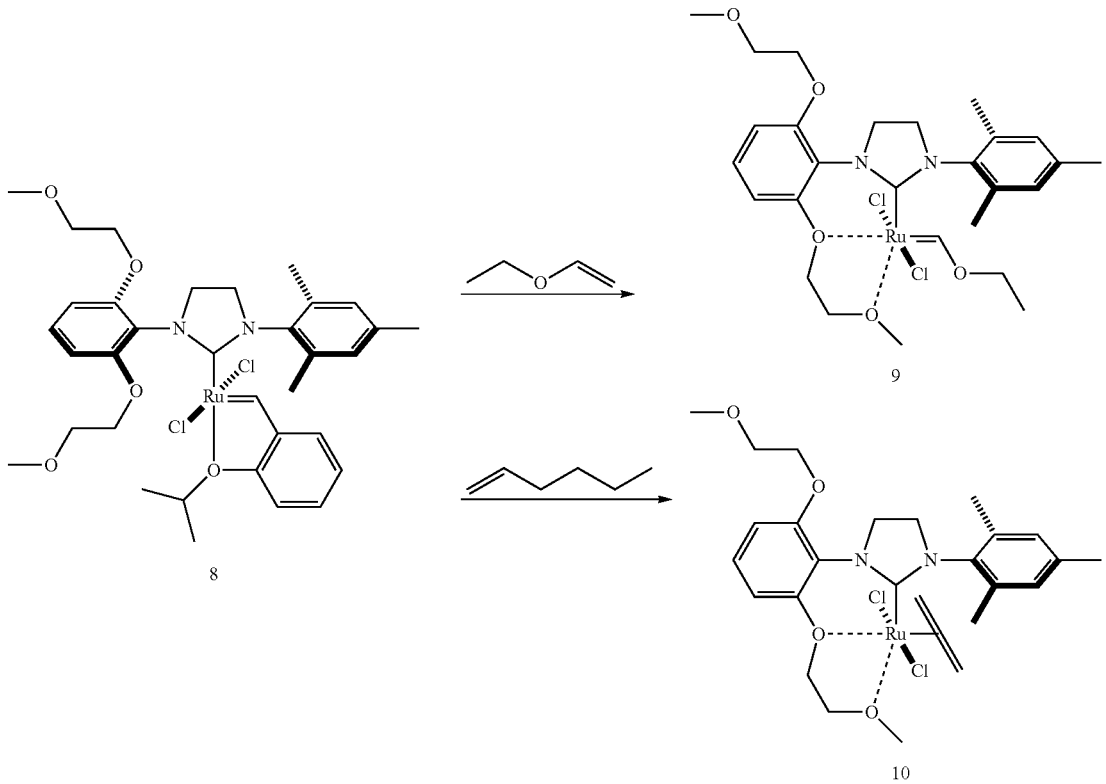

Crystal structure of Fischer carbene 9. Thermal ellipsoids at 50% probability and hydrogen atoms omitted for clarity is shown below:

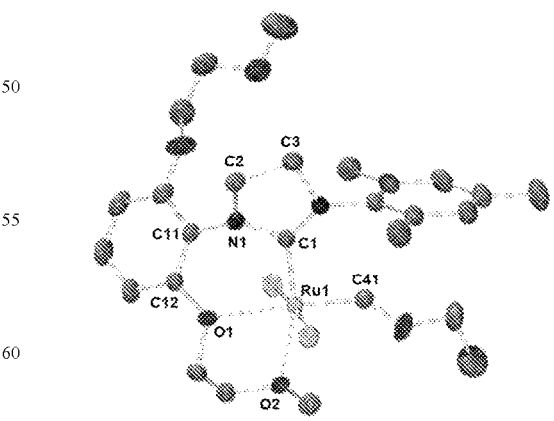

Crystal structure of degradation product 10. Thermal ellipsoids at 50% probability and hydrogen atoms omitted for clarity is shown below:

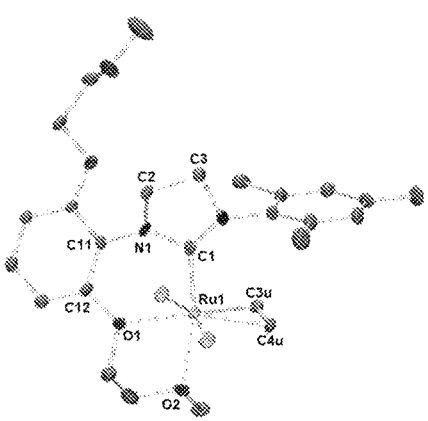

The crystal structures shown reveal that the two compounds (9 and 10) obtained by transforming catalyst 8 into a 14-electron species contain very similar conformations adopted by the NHC ligand. Both compounds exhibit O→Ru←O chelation resulting from a single ether arm wrapping around the metal. As a result, the ether-substituted aromatic ring is rotated away from perpendicular to the NHC heterocycle around the N1-C11 bond. Additionally, the entire NHC ligand is rotated around the C1-Ru1 bond in order to properly align the ether arm for chelation with the metal center. The similar measurements of distances and angles presented in Table 1 reflect the similar conformations adopted by the NHC in compounds 9 and 10. Because these compounds mimic the sterically wide-open and electron deficient active catalyst methylidene (Ru=CH$_2$), these crystal structures provide insight into the conformation adopted by the catalyst upon initiation of the olefin metathesis cycle.

TABLE 1

Selected distances and angles for 7, 8, 9, and 10

|  | 7 | 8 | 9 | 10 |
|---|---|---|---|---|
| Ru - nearest O$_{NHC}$ (Å) | — | 4.02 | 2.24 | 2.19 |
| Ru - 2$^{nd}$ nearest O$_{NHC}$ (Å) | — | 4.07 | 2.30 | 2.27 |
| N1—C11 (deg.) | 73.4 | 87.4 | 51.9 | 45.6 |
| C1—Ru1 (deg.) | — | 4.5 | 19.0 | 20.5 |
| O1—Ru1—O2 (deg.) | — | — | 76.2 | 78.2 |

Fischer carbene 9 is formed when catalyst 8 performs a single round of olefin metathesis with ethyl vinyl ether. Because Fischer carbenes are metathesis inactive, 9 is no longer able to propagate the cycle. This 14-electron species is vulnerable to reactions which provide the metal with additional electron density, most notably dimerization through bridging chlorines. However, O→Ru←O chelation stabilizes the compound from any further reactions. Degradation product 10 appears very similar to Fischer carbene 9, but the mechanism of formation is quite different as illustrated below. The metallacyclobutane key intermediate 8c is susceptible to β-hydride elimination, thus affording 8d. Reductive elimination of propene then generates the π-complex 8e. However, ethylene is produced via each successful round of metathesis, whereas propene is only produced once per catalyst death. As a result, there is significantly more ethylene than propene present in solution. Ethylene is also smaller and therefore sterically more favorable for forming the π-complex. As a result, the propene of 8e is displaced by ethylene to afford the final degradation product 10. Once again, O→Ru←O chelation stabilizes the electron deficient compound to prevent any further decomposition reactions. This differs from the decomposition of a tetra-substituted catalyst previously reported by our group. That catalyst's degradation product which was analogous to compound 10 decomposed further by attacking the active catalyst methylidene to afford a dinuclear bridging methylidene degradation product.

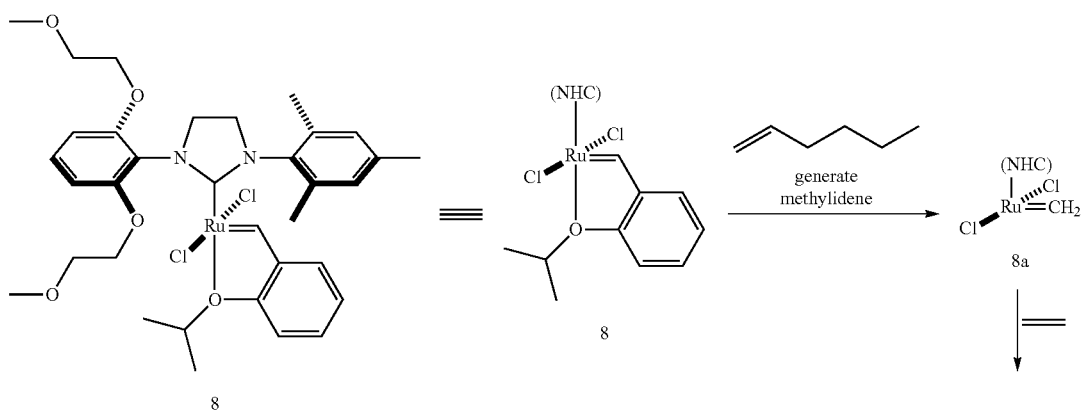

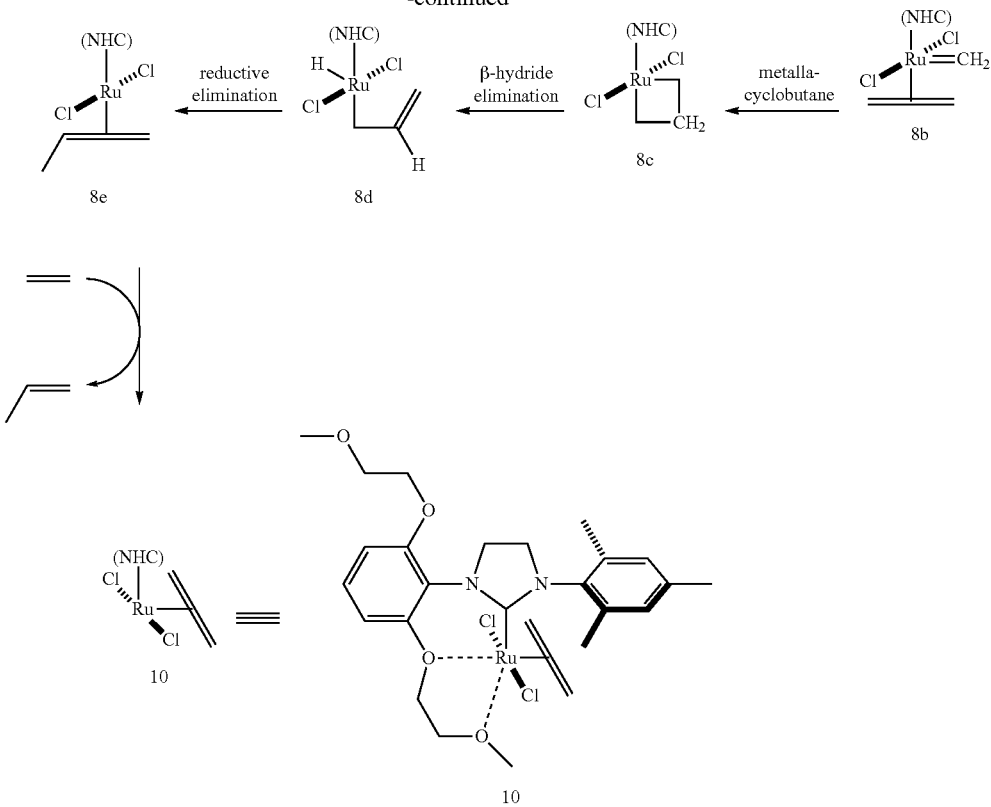

Catalyst 8 and the commercial catalyst 3 were tested for RCM activity with the substrate diethyl diallylmalonate (DEDAM, 10). The kinetic profile of the two catalysts is shown in FIG. 2 for 0.1 mol % catalyst loading. The ether-substituted catalyst 8 was found to be slower than 3 and displays a slight inflection point (change in concavity) at approximately 15 minutes. This may be due to the presence of O→Ru coordination while in solution, which sterically crowds the coordination sphere of Ru and discourages approaching alkenes from binding to the metal. Unfortunately, the TON did not improve when testing the catalyst at the much lower concentration of 0.001 mol %. Catalyst 3 has a maximum TON of 22,300 while catalyst 8 has a maximum TON of 24,800.

General Methods

All air-sensitive manipulations were performed in oven-dried glassware under inert conditions using either standard Schlenk techniques or a glovebox containing an atmosphere of purified argon. Solvents for air-sensitive reactions were dried and degassed prior to use. Tetrahydrofuran (THF) and toluene were dried using sodium/benzophenone ketyl followed by static vacuum distillation via bulb-to-bulb. Pentane, hexanes, 1-hexene, dichloromethane (DCM), and dichloroethane (DCE) were dried using calcium hydride ($CaH_2$) followed by static vacuum distillation via bulb-to-bulb. Solvents were degassed via sparging or freeze-pump-thaw following their distillation from the drying agent, and then stored over 4 Å molecular sieves for at least 12 h prior to use. Ethyl vinyl ether (EVE) was dried using $CaH_2$, then distilled and sparged with argon. However, EVE was not stored over molecular sieves because this triggers polymerization. The NMR solvents $C_6D_6$ and $CD_2Cl_2$ were sparged with argon and then stored over 4 Å molecular sieves in a glovebox. Diethyl diallylmalonate (DEDAM, 11) was purified by standard vacuum distillation using minimal heat (40-60° C. at ~25 mtorr). All other reagents were used as received. Elemental analysis was performed at the ALS Environmental Laboratory in Tucson, Arizona. X-ray diffraction was performed at the X-ray Crystallography Facility of the California Institute of Technology in Pasadena, California. NMR spectra were recorded on a Varian 400 MHz spectrometer running VnmrJ or a Bruker 400 MHz spectrometer running TopSpin. Chemical shifts are reported in parts per million (ppm) downfield from tetramethylsilane (TMS) with reference to internal solvent for $^1$H NMR and $^{13}$C NMR spectra. Peak abbreviations are used as follows: s=singlet, d=doublet, t=triplet, m=multiplet, br=broad.

Synthesis

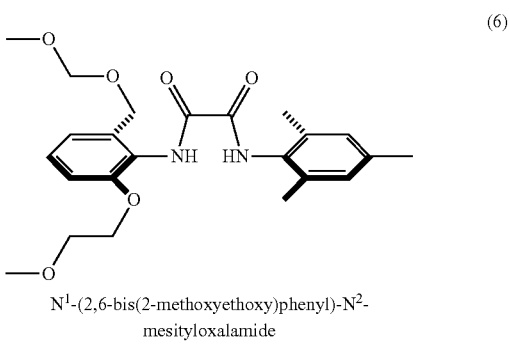

$N^1$-(2,6-bis(2-methoxyethoxy)phenyl)-$N^2$-mesityloxalamide (6)

A round bottom flask was charged with compound 4 (2.29 g, 9.48 mmol), compound 5 (2.40 g, 10.2 mmol), and THF (100 mL), then stirred well to obtain a homogenous solution. This was then transferred via cannula into another flask containing a suspension of AlCl$_3$ (1.43 g, 10.7 mmol) in toluene (50 mL). Triethylamine (3.0 mL, 22 mmol) was then injected, instantly generating a bright yellow cloudy mixture. A reflux condenser was attached, and the reaction then stirred at 60° C. for 20 h, soon darkening in color. The flask was placed in an ice bath, and the excess AlCl$_3$ was then quenched by the slow addition of aqueous KOH (20 mL, 10 wt %) followed by filtering through celite to remove the aluminum salts. The filtrate was transferred to a separatory funnel, the organic phase collected, and the aqueous then extracted with toluene (3×50 mL). The pooled extracts were washed with aqueous Na$_2$CO$_3$ (2×100 mL, 10 wt %), dried with Na$_2$SO$_4$, filtered through celite, and then the solvent was removed under vacuum to give a pale brown solid. This was dissolved in minimal DCM, and then the slow addition of a large volume of hexanes via an addition funnel triggered the precipitation of the oxalamide product 6 (3.41 g, 7.92 mmol) as a pale tan powder in 84% yield.

$^1$H NMR (400 MHz, CDCl$_3$): δ 2.23 (s, 6H), 2.29 (s, 3H), 3.43 (s, 6H), 3.73 (t, 4H), 4.18 (t, 4H), 6.65 (d, 2H), 6.93 (s, 2H), 7.20 (t, 1H), 8.78 (s, 1H), 8.89 (s, 1H)

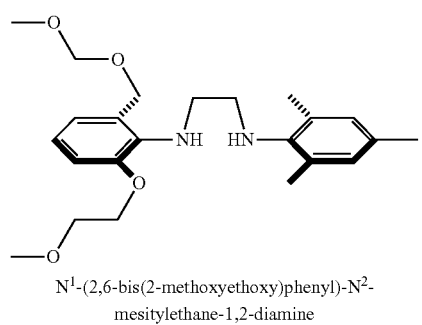

(13)

N$^1$-(2,6-bis(2-methoxyethoxy)phenyl)-N$^2$-mesitylethane-1,2-diamine

A round bottom flask was charged with compound 6 (2.50 g, 5.81 mmol) and THF (75 mL), then placed in an ice bath. A solution of 60 w % red al in toluene (12.0 mL, 36.9 mmol) was slowly injected, a reflux condenser attached, and the reaction was stirred at 60° C. for 24 h. The flask was placed in an ice bath, and the excess hydride was then quenched by the slow addition of aqueous KOH (30 mL, 10 w %) followed by filtering through celite to remove the aluminum salts. The filtrate was transferred to a separatory funnel and extracted with ether (2×50 mL). The pooled extracts were washed with aqueous Na$_2$CO$_3$ (2×50 mL, 20 w %), dried with Na$_2$SO$_4$, filtered through celite, and the solvent was then removed under vacuum to give a pale brown solid. This was dissolved in a boiling solution of THF and hexanes and then slowly cooled to −20° C. to give the diamine product 13 (1.72 g, 4.27 mmol) as white needles in 73% yield.

$^1$H NMR (400 MHz, CDCl$_3$): δ 2.22 (s, 6H), 2.34 (s, 3H), 3.03 (t, 2H), 3.37 (s, 6H), 3.51 (t, 2H), 3.72 (t, 4H), 4.13 (t, 4H), 6.56 (d, 2H), 6.74 (t, 1H), 6.80 (s, 2H)

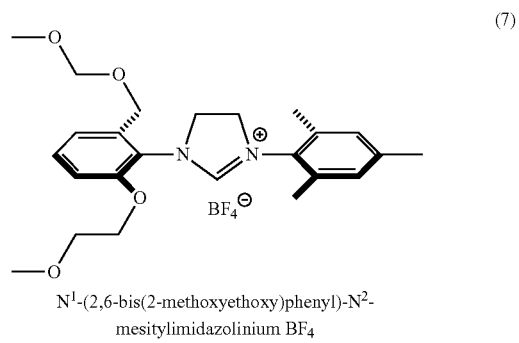

(7)

N$^1$-(2,6-bis(2-methoxyethoxy)phenyl)-N$^2$-mesitylimidazolinium BF$_4$

A round bottom flask was charged with compound 13 (1.03 g, 2.56 mmol), NH$_4$BF$_4$ (0.45 g, 4.3 mmol), and trimethyl orthoformate (30 mL). A reflux condenser was attached, and the reaction was stirred at 110° C. for 18 h. The mixture was filtered through celite, and the solvent was then removed under vacuum to give a pale orange solid. This was dissolved in a boiling solution of isopropanol and hexanes and then slowly cooled to room temperature to give the imidazolinium product 7 (1.06 g, 2.11 mmol) as white needles in 82% yield.

$^1$H NMR (400 MHz, CDCl$_3$): δ 2.30 (s, 3H), 2.38 (s, 6H), 3.28 (s, 6H), 3.75 (t, 4H), 4.23 (t, 4H), 4.41 (t, 2H), 4.68 (t, 2H), 6.67 (d, 2H), 6.97 (s, 2H), 7.30 (t, 1H), 8.15 (s, 1H)

$^{13}$C NMR (100 MHz, CDCl$_3$): δ 17.22, 21.05, 51.38, 58.79, 68.85, 70.46, 106.35, 113.74, 129.93, 130.39, 130.88, 135.19, 140.66, 154.13, 159.78

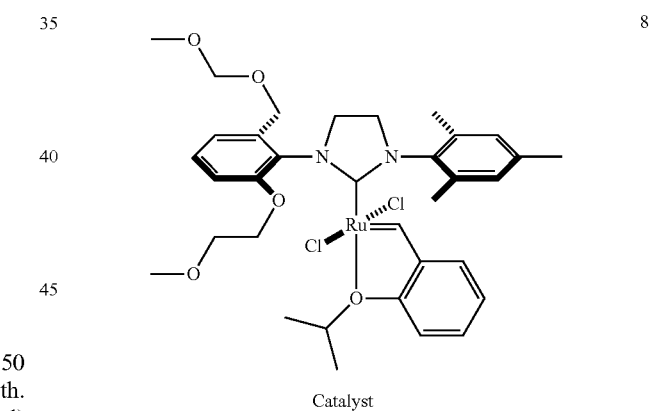

8

Catalyst

In an argon glovebox: a round bottom flask was charged with compound 7 (0.27 g, 0.54 mmol), KHMDS (0.11 g, 0.55 mmol), and toluene (10 mL). The mixture was stirred for 2 h, then the 1$^{st}$ generation Hoveyda-Grubbs catalyst 2 (0.25 g, 0.42 mmol) was added, and the solution was stirred for an additional 6 h, quickly turning cloudy dark green. The mixture was removed from the glovebox, filtered through celite, and the solvent then removed under vacuum. The crude material was purified by column chromatography (silica gel, gradient from 1/1 to 1/9 of hexanes/ethyl acetate) to afford a dark green solid. This was dissolved in minimal DCM in a test tube, the solution then layered with excess hexanes, and allowed to sit still in the freezer for 3 days to precipitate the 2$^{nd}$ generation catalyst product 8 (0.21 g, 0.29 mmol) as a green microcrystalline powder in 69% yield based on 2 or 54% yield based on 7.

¹H NMR (400 MHz, CDCl₃): δ 1.31 (d, 6H), 2.37 (s, 6H), 2.44 (s, 3H), 3.44 (s, 6H), 3.75 (m, 2H), 3.95 (m, 2H), 4.07 (m, 2H), 4.26 (m, 6H), 4.90 (septet, 1H), 6.65 (d, 2H), 6.79 (d, 1H), 6.84 (t, 1H), 6.93 (d, 1H), 7.07 (s, 2H), 7.32 (t, 1H), 7.46 (t, 1H), 16.64 (s, 1H)

¹³C NMR (100 MHz, CDCl₃): δ 18.50, 21.09, 21.56, 50.37, 52.34, 58.82, 67.93, 71.56, 74.75, 105.22, 113.09, 117.24, 122.11, 129.68, 130.11, 138.23 138.67, 145.81, 152.59, 159.52, 211.22, 296.52

CHN elemental analysis for $C_{34}H_{45}Cl_2N_2O_5Ru$—Calculated: C, 55.66%, H, 6.18%, N, 3.82%, Found: C, 55.99%, H, 6.54%, N, 3.81%.

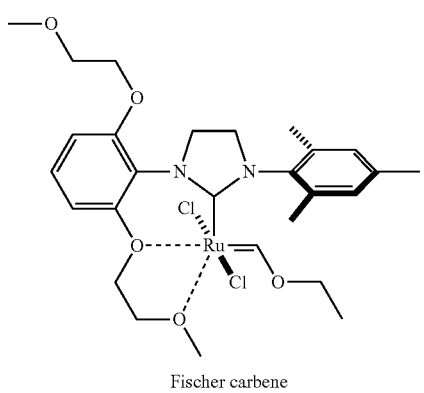

Fischer carbene

A vial was charged with catalyst 8 (40 mg) and toluene (2 mL). Ethyl vinyl ether (0.8 mL) was slowly added, the reaction was allowed to stir for 1 h, and then the solvent was removed under vacuum. The residue was dissolved with minimal toluene, and slowly pipetted into a vial of hexanes (10 mL) to trigger the precipitation of Fischer carbene 9 as a bright orange powder, which was then collected on a frit and washed with hexanes. The powder was dissolved in a concentrated solution of DCE and toluene, and then the slow diffusion of pentane vapors at 0° C. afforded crystals of 9 suitable for x-ray diffraction.

¹H NMR (400 MHz, CDCl₃): δ 1.26 (t, 6H), 2.32 (t, 11H), 3.73 (s, 6H), 3.79 (m, 5H), 4.21 (m, 4H), 6.76 (d, 2H), 6.92 (s, 2H), 7.15 (t, 1H), 13.61 (s, 1H)

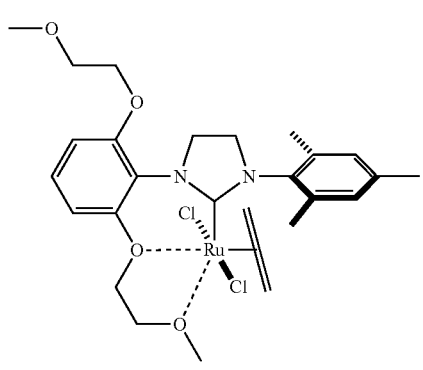

Degradation product

A round bottom flask was charged with catalyst 8 (35 mg) and toluene (2 mL). 1-hexene (4 mL) was slowly added, and the reaction was stirred for 1 h. Most of the solvent was then removed under vacuum, the residue dissolved with minimal toluene, and carefully pipetted into a large volume of hexanes to trigger the precipitation of degradation product 10 as a pale orange powder, which was then collected on a frit and washed with hexanes. This was dissolved in a concentrated solution of DCE and toluene, and then the slow diffusion of pentane vapors at 0° C. afforded crystals of 10 suitable for x-ray diffraction.

¹H NMR (400 MHz, CDCl₃): δ 1.35 (m, 3H), 2.20 (s, 3H), 2.23 (s, 6H), 3.05 (s, 6H), 3.42 (s, 3H), 3.81 (t, 3H), 4.01 (t, 2H), 4.10 (t, 2H), 4.23 (t, 2H), 4.96 (t, 2H), 6.82 (d, 2H), 6.94 (s, 2H), 7.10 (t, 1H)

¹³C NMR (100 MHz, CDCl₃): δ 14.0, 14.1, 14.2, 17.9, 18.6, 21.1, 22.3, 22.6, 28.8, 31.6, 31.7, 32.6, 34.1, 48.9, 52.7, 60.6, 124.9, 128.2, 129.0, 129.2, 137.0, 138.1, 216.7

Testing Catalyst Performance

Monitoring Kinetics for the RCM of DEDAM

In a glovebox, a $2.7 \times 10^{-4}$ M stock solution was prepared by dissolving catalyst 8 (5.0 mg, 0.0068 mmol) in DCM (25 mL). A micro syringe was charged with 185 μL of this solution. An NMR tube with a screw-cap septum top was charged with DEDAM (12 μL, 50 μmol) and CD₂Cl₂ (300 μL). The NMR tube and syringe were then removed from the glovebox. The NMR spectrometer was equilibrated at 30° C. and then a quick spectrum was obtained to verify the purity of the substrate. The catalyst solution was then injected into the tube, the contents were inverted several times to aid in mixing, and the tube was then reinserted into the spectrometer. The sample was heated at 30° C. for 1 hour and ¹H NMR spectra were collected at 2 min. intervals. The % conversion was determined by comparing the ratio of integrals corresponding to the methylene protons in the substrate at δ 2.6 (t) with those in the product at δ 3.0 (s). This procedure provides 0.1 mol % catalyst loading in a 0.1 M solution of DEDAM. Monitoring kinetics at different concentrations was achieved by creating new stock solutions and adjusting the volume of CD₂Cl₂ so that the total volume always equals ~500 μL in order to maintain a 0.1 M concentration of DEDAM.

Determining Maximum TON for the RCM of DEDAM

In a glovebox, a micro syringe was charged with 10 μL of a $2.7 \times 10^{-4}$ M stock solution of catalyst 8. A tall vial with a stir bar and a cap punctured with a needle was charged with DEDAM (60 μL, 250 μmol) and CD₂Cl₂ (240 μL). The vial and syringe were then removed from the glovebox. The catalyst solution was injected into the vial, and the reaction was stirred at 30° C. for many hours. Aliquots of the reaction were taken every few hours to calculate the % conversion by ¹H NMR. The reaction was deemed complete when the % conversion no longer increased between time intervals, typically requiring at least 8-12 hours. The highest TON were achieved at 0.001 mol % catalyst loading. Lowering the concentration of catalyst even further than this resulted in diminished TON.

Example 2: Development and Characterization of Contemplated Embodiments

Materials and Methods.

All reactions involving metal complexes were conducted in oven-dried glassware under an atmosphere of nitrogen.

Solvents were dried using Grubbs type solvent purifiers, CaH$_2$ still, or a sodium/benzophenone still, as well as sitting over 4 Å molecular sieves, using standard glovebox techniques. All commercially obtained reagents were used as received. Purasil silica gel (particle size 0.040-0.063 mm) was used for flash column chromatography. Organic reagents were purchased from Sigma-Aldrich Chemical Company; Milwaukee, WI and metal salts were obtained from Sigma Aldrich, Materia Inc., and Umicore. $^1$H, $^{13}$C and $^{31}$P NMR spectra were recorded on a Bruker 400 MHz NMR and are reported relative to TMS (δ 0.0) for $^1$H and $^{13}$C, and H$_3$PO$_4$ (δ 0.0) for $^{31}$P. Data for $^1$H NMR spectra are reported as follows: chemical shift (δ ppm), multiplicity, coupling constant (Hz) and integration. Data for $^{13}$C and $^{31}$P NMR spectra are reported in terms of chemical shift. X-ray crystallographic structures were obtained by Dr. Mike Takase of the California Institute of Technology Beckman Institute X-Ray Crystallography Laboratory.

The conventional and contemplated embodiments disclosed herein are synthesized according to each of the methods outlined below:

1-(Mesityl)-3-(2-hydroxyphenyl)-4,5-dihydro-imidazolium chloride (1a) synthesized according to the procedure outlined in A New Class of Chelating N-Heterocyclic Carbene Ligands and Their Complexes with Palladium Andrew W. Waltman and and Robert H. Grubbs* Organometallics 2004 23 (13), 3105-3107 DOI: 10.1021/om049727c.

1-(2,6-Diisopropylphenyl))-3-(2-hydroxyphenyl)-4,5-dihydro-imidazolium chloride (1b) synthesized according to the procedure outlined in A New Class of Chelating N-Heterocyclic Carbene Ligands and Their Complexes with Palladium Andrew W. Waltman and and Robert H. Grubbs* Organometallics 2004 23 (13), 3105-3107 DOI: 10.1021/om049727c.

2-(pyridin-2-yl)ethyl 4-methylbenzenesulfonate (2) 2-(pyridin-2-yl)ethan-1-ol (2.78 g, 22 mmol, 1 equiv.) 4-methylbenzenesulfonyl chloride (4.21 g, 22 mmol, 1 equiv.) and 4-dimethylamino pyridine (0.15 g, 1.2 mmol, catalytic) were dissolved in a 250 mL round bottom flask with stir bar with CH$_2$Cl$_2$ (100 mL). The flask was sealed with a rubber septum and the solution was cooled in an ice-bath. Triethylamine (4.21 g, 33.29 mmol, 1.5 equiv.) was added drop-wise to the solution while stirring. The solution was allowed to warm up to room temperature and stir for 12 hours. The solution was then washed (3×50 mL portions of saturated NaHCO$_3$, or until the aqueous phase was clear) and the organics were collected and dried with MgSO$_4$, filtered, and pumped to dryness. The resulting product was a light yellow oil, which was cycled into the glovebox and placed on sieves immediately after drying (5.85 g, 21.1 mmol 95%). $^1$H NMR (400 MHz, CDCl$_3$) δ 8.36 (d, 1H), 7.62 (d, 2H), 7.53 (t, 1H), 7.24 (d, 2H), 7.08 (m, 2H), 4.38 (t, 2H), 3.06 (t, 2H), 2.37 (s, 3H).

3-Mesityl-1-(2-(2-(pyridin-2-yl)ethoxy)phenyl)-4,5-dihydro-1H-imidazol-3-ium tosylate (3a) 1-(Mesityl)-3-(2-hydroxyphenyl)-4,5-dihydro-imidazolium chloride (1a) (4.00 g, 12.63 mmol, 1 equiv.) was weighed into a 250-mL over-dried round-bottom flask equipped with a football shaped magnetic stir bar. To this was added 2-(Pyridin-3-yl)ethyl 4-methylbenzenesulfonate (2) (5.25 g, 18.94 mmol, 1.5 equiv.) dissolved in acetonitrile (150 mL). 4 Å molecular sieves (15 volume %) were added to this suspension. Oven-dried K$_2$CO$_3$ (2.62 g, 18.94 mmol, 1.5 equiv.) was added into the flask, which was then sealed with a rubber septum, wrapped with wire and electrical tape to ensure an airtight seal. The slurry was heated to 85° C. while stirring over 24 hours. The reaction changed from a white/pale yellow slurry into a brown slurry. Solids were filtered off over celite while the solution was still warm, and the filtrate was pumped to dryness. Affording a dark brown goop. After stirring for 30 minutes in approximately 60 mL of ethyl acetate, a pale brown/grey solid crashed out of the brown supernatant. The solution was cooled and the precipitate was collected via vacuum filtration. The white/grey solid was washed with diethyl ether and dried (5.47 g, 9.8 mmol, 77.7%). $^1$H NMR (400 MHz, CDCl$_3$) δ 9.26 (s, 1H), 7.74 (d, 2H), 7.72 (m, 1H), 7.55 (m, 2H), 7.28 (m, 1H), 7.23 (m, 1H), 6.95 (m, 4H), 6.86 (s, 2H), 6.85 (m, 1H), 4.88 (t, 2H), 4.43 (t, 4H), 3.21 (t, 2H), 2.32 (s, 3H), 2.28 (s, 9H).

3-(2,6-diisopropylphenyl)-1-(2-(2-(pyridin-2-yl)ethoxy)phenyl)-4,5-dihydro-1H-imidazol-3-ium tosylate (3b) was synthesized in a manner analogous to that for 3a, using 1-(2,6-Diisopropylphenyl))-3-(2-hydroxyphenyl)-4,5-dihydro-imidazolium chloride (1b) (6.67 g, 11.1 mmol, 88.5%). Anion exchange was performed on the tosylate salt in order to grow crystals suitable for x-ray crystallographic analysis. The pale grey powder (3b) was added to a 50 mL oven dried round bottom flask with stir bar (2.55 g, 4.3 mmol, 1 equiv.) along with oven dried LiCl (2.01 g, 47.4 mmol, 10 equiv.) and dissolved in dry THF (20 mL). The solution was heated to 60° C. for 2 hours and the solids went into solution as the reaction progressed. The solution was pumped to dryness and then dissolved in CH$_2$Cl$_2$. The solids were filtered off over celite and the filtrate was pumped to dryness to afford the chloride salt of the product as a light beige solid (3c). The chloride salt was then recrystallized using 1:9 hot isopropanol and hexane. $^1$H NMR of the tosylate salt (3b)$^1$H NMR (400 MHz, CDCl$_3$) δ 9.56 (s, 1H), 7.82 (d, 2H), 7.64 (d, 1H), 7.53 (t, 1H), 7.46 (m, 1H), 7.29 (m, 4H), 7.11 (m, 4H), 7.04 (m, 1H), 6.86 (q, 1H), 5.12 (t, 2H), 4.60 (t, 2H), 4.47 (t, 2H), 3.19 (t, 2H), 3.08 (septet, 2H), 2.33 (s, 3H), 1.34 (d, 6H), 1.21 (d, 6H).

C648 ((H$_2$I)(O)(N)Ru(CHPh)Cl$_2$) or H$_2$I-Mes-Pyr RuCHPhCl$_2$ (4a)

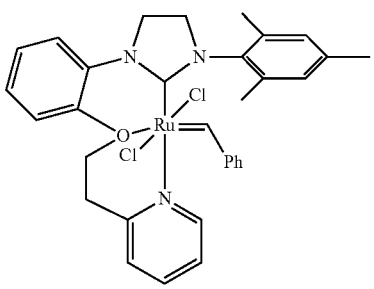

C648

3-Mesityl-1-(2-(2-(pyridin-2-yl)ethoxy)phenyl)-4,5-dihydro-1H-imidazol-3-ium tosylate (3a) (100 mg, 0.18 mmol, 1.3 equiv.) and potassium hexamethyldisilazide (33.23 mg, 0.17 mmol, 1.2 equiv.) dissolved in toluene (5 mL) were allowed to stir for 1 hr. at room temperature, generating the active N-heterocyclic carbene as an amber colored slurry. The carbene mixture was added drop wise into a 50 mL oven-dried Schlenk tube containing RuCl$_2$(PCy$_3$)$_2$(CHPh) (114 mg, 0.14 mmol, 1 equiv.) dissolved in toluene (10 mL). An additional 2 mL of toluene was added to the reaction flask which was then sealed and heated at 60° C. for 4 hours. The purple solution turned brown and eventually green in color. The solution was then pumped to dryness affording a sticky greenish brown solid. Upon addition of chloroform, salts were precipitated from the solution and filtered off over celite. The filtrate was concentrated down to approximately 2 mL. The crude material was purified via flash column chromatography with 1:1 hexane:ethyl acetate to remove unreacted purple RuCl$_2$(PCy$_3$)$_2$(CHPh) first, then eluting the product as an emerald-green band with 100% ethyl acetate which was pumped to dryness. (87.7 mg, 0.135 mmol, 96.7%). $^1$H NMR (400 MHz, CDCl$_3$) δ 19.12 (s, 1H), 7.77 (m, 2H), 7.51 (m, 1H), 7.41 (m, 2H), 7.33 (m, 1H), 7.20 (m, 2H), 7.14 (m, 2H), 7.05 (t, 2H), 6.62 (s, 2H), 6.55 (t, 1H), 4.82 (t, 2H), 4.55 (s, 2H), 4.48 (t, 2H), 3.85 (t, 2H), 2.25 (s, 6H), 2.15 (s, 3H).

C690 ((H$_2$I)(O)(N)Ru(CHPh)Cl$_2$) or H$_2$I-DIPP-Pyr RuCHPhCl$_2$ (4b)

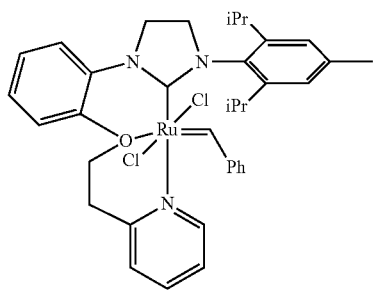

C690

C690 was synthesized in a manner analogous to that for 4a, using 3-(2,6-diisopropylphenyl)-1-(2-(2-(pyridin-2-yl)ethoxy)phenyl)-4,5-dihydro-1H-imidazol-3-ium tosylate (3b) (100 mg, 0.14 mmol, 1.3 equiv.) (81.2 mg, 0.12 mmol, 96.5%). Crystals suitable for x-ray crystallographic analysis were grown via vapor diffusion recrystallization using the vial within a vial method. The product was dissolved in minimal chloroform placed in the inner vial, which was then placed inside another vial containing diethyl ether. Crystals were allowed to grow for several days. The product was collected and washed with pentane and isolated as a mixture of dark green rhombic and needle-like crystals. $^1$H NMR (400 MHz, CDCl$_3$) δ 19.19 (s, 1H), 7.45 (m, 6H), 7.20 (m, 5H), 7.00 (m, 4H), 6.60 (m, 1H), 4.84 (t, 2H), 4.63 (s, 2H), 4.43 (t, 2H), 3.92 (t, 2H), 3.47 (septet, 2H), 1.08 (m, 12H).

Ru 614 ((H$_2$I)(O)(N)Ru(CH$_2$)Cl$_2$) or H$_2$I-DIPP-Pyr Ru(CH$_2$)Cl$_2$ (5)

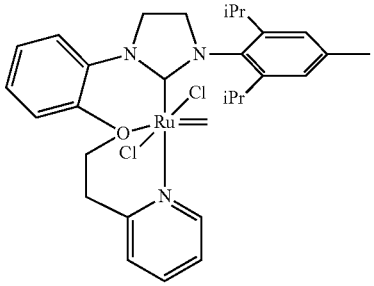

C614

Ru 690 ((H$_2$I)(O)(N)Ru(CHPh)Cl$_2$) or H$_2$I-DIPP-Pyr RuCHPhCl$_2$ (4B) was added to a 100 mL oven dried Schlenk tube with stir bar inside an inert glovebox with 30 mL of dried toluene. The flask was sealed, cycled out, and placed in a liquid nitrogen bath. Once frozen, the tube was evacuated using the Schlenk line (20 mtorr) and back filled with 99.9995% ethylene gas (1.5 atm) while it thawed. The tube was sealed and placed in an oil bath at 70° C. for 1 hour. As the solution warmed up, the Ru 690 went into solution. After 20 min. a greyish precipitate was visible in the dark green solution. The solution was then cooled in an ice bath and the solids were collected via vacuum filtration, washed with pentane, and dried on the Schlenk line (20 mtorr). The solid was sufficiently pure enough to characterize via $^1$H NMR. $^1$H NMR (400 MHz, CDCl$_3$) δ 19.60 (s, 2H), 8.18 (s, 1H), 7.52 (t, 1H), 7.46 (t, 1H), 7.37 (t, 2H), 7.30 (m, 1H), 7.21 (m, 3H), 7.11 (d, 1H), 6.89 (t, 1H), 4.97 (t, 2H), 4.36 (t, 2H), 4.07 (m, 4H), 3.13 (septet, 2H), 1.50 (d, 6H), 1.06 (d, 6H).

Preparation of DIPP Methyl Pyridine Imidazolium Tosylate (Project: 029-120)

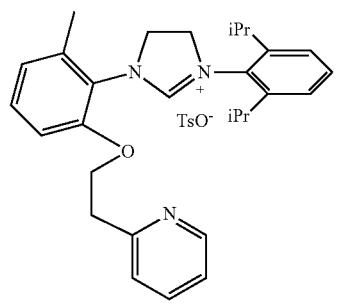

1-(2,6-Diisopropylphenyl)-3-(2-hydroxy-6-methylphenyl)-4,5-dihydro-imidazolium chloride (1.78 g, 4.77 mmol, 1 equiv.) was weighed into a 250-mL over-dried round-bottom flask equipped with a football shaped magnetic stir bar. To this was added 2-(Pyridin-3-yl)ethyl 4-methylbenzenesulfonate (3.97 g, 14.3 mmol, 3 equiv.) dissolved in acetonitrile (20 mL). 3 Å and 4 Å molecular sieves (approx. 0.3 g and 0.7 g respectively) was added to this suspension. Crushed and oven-dried $K_2CO_3$ (0.824 g, 5.96 mmol, 1.25 equiv.) was weighed on an aluminum weigh boat and charged into the flask, followed by 100 mL acetonitrile. The flask was sealed with a rubber septum, wrapped with copper wire and electrical tape to ensure air-tight seal and to prevent pressure from popping the septum off, and heated to 80° C. while stirring over two nights (40 hr). The reaction changed from a white/pale yellow slurry in clear brown solution to a cappuccino-brown slurry underneath a supernatant dark brown solution. Solids were filtered off over Celite, and solvent was removed from filtrate under reduced pressure and heat (50° C.) followed by a strong vacuum via Schlenk manifold (20 mtorr) for 6 hr, affording a deep dark brown goop. After stirring for 15 minutes in approximately 60 mL of ethyl acetate, a pale brown/grey solid crashed out of a supernatant clear pale brown solution. The solid was collected on a frit and washed with diethyl ether followed by cold toluene to provide the desired product as a pale grey powdery solid (2.07 g, 3.37 mmol, 70.61% yield).

$^1$H NMR (400 MHz, $CD_2Cl_2$) δ 8.70 (s, 1H), 8.30 (d, 1H), 7.63 (t, 1H), 7.51 (t, 1H), 7.31 (m, 4H), 7.25 (d, 1H), 7.10 (t, 1H), 6.94 (m, 4H), 4.52 (t, 2H), 4.33 (m, 4H), 3.27 (t, 2H), 2.99 (septet, 2H), 2.40 (s, 3H), 2.29 (s, 3H), 1.28 (dd, 12H).

Anion Swap from OTs- to Cl-(DIPP Methyl Pyridine Imidazolium Chloride)

DIPP Methyl Pyridine Imidazolium Tosylate (1.62 g, 2.64 mmol, 1 equiv.) and LiCl (1.17 g, 27.6 mmol, 10 equiv.) were dissolved in tetrahydrofuran (80 mL) and heated to 60° C. for 2 hr. Solvent was removed and solids were dried in vacuo. Resulting solids were dissolved in minimal dichloromethane, resulting in the precipitation of LiOTs salts, which were filtered off. Removal of the solvent from the resulting filtrate afforded a dark orange/brown oil. The desired chloride salt of the product was precipitated with ethyl acetate as a tan pink/brown solid (1.24 g, 2.59 mmol, 98.2% yield). Product was confirmed by $^1$H NMR spectroscopy. The spectrum was very similar to the tosylate salt, with the absence of 4H in the aromatic region and a sharp singlet (3H) at 2.29 ppm.

Preparation of Ru 704 (($H_2I$)(O)(N)(CHPh)$Cl_2$) or DIPP Methyl Pyr RuCHPh$Cl_2$ (Project: 029-131)

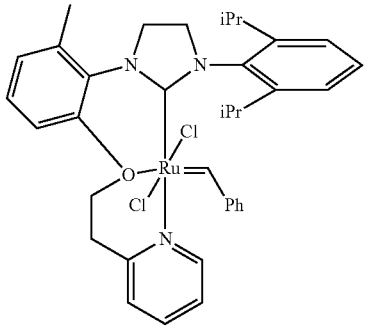

C704

DIPP Methyl Pyridine Imidazolium Tosylate (287 mg, 0.658 mmol, 1.80 equiv.) and potassium hexamethyldisilazide (132 mg, 0.662 mmol, 1.81 equiv.) dissolved in toluene (15 mL) were charge into a vial equipped with a skinny magnetic stir bar. The mixture was stirred for 2 hr at room temperature, generating the active N-heterocyclic carbene, in a bright orange slurry. The carbene mixture was added dropwise into a stirred oven-dried round-bottom flask containing $RuCl_2(PCy_3)_2$(=CHPh) (300.9 mg, 0.3656 mmol, 1.00 equiv.) dissolved in toluene (50 mL). An additional 75 mL of toluene was added to the reaction flask which was then septum capped and stirred for 4 hr at room temperature. The solvent was removed under reduced pressure at 60° C. and subsequently dried via Schlenk vacuum manifold (20 mtorr) affording a sticky dark brown solid. Upon addition a dichloromethane, salts were precipitated from the solution and filtered off. The filtrate was concentrated down to approximately 3 mL. The crude material was purified through flash column chromatography eluting the product as an emerald-green band with ethyl acetate. The product was purified via vapor diffusion recrystallization using an inner vial containing product dissolved in minimal dichloromethane placed in a closed jar containing a reservoir of diethyl ether. The product was collected and washed with pentane and isolated as small crystals with a fuzzy appearance (44.3 mg, 0.0630 mmol, 17.22% yield).

$^1$H NMR (400 MHz, $CDCl_3$) δ 19.4 (s, 1H), 7.44 (m, 4H), 7.34 (m, 2H), 7.20 (m, 5H) 6.99 (t, 2H), 6.77 (broad s, 1H), 6.61 (td, 1H), 5.98 (broad s, 1H), 4.84 (t, 2H), 4.40 (m, 1H), 3.95 (broad s, 2H), 3.69 (broad d, 2H), 3.32 (broad d, 2H), 2.63 (s, 3H), 0.94 (broad q, 12H).

Example 3: Olefin Metathesis Catalyst with an Nhc Bearing Hemi-Labile Polyether Arm: Structure, Activity, and Decomposition Herein, we report the synthesis and study of a $2^{nd}$ generation Hoveyda-type complex bearing an NHC with 4 methoxyethoxy polyether arms (catalyst 8). It was prepared by the highly modular pathway shown below (6 steps, 19% yield overall).

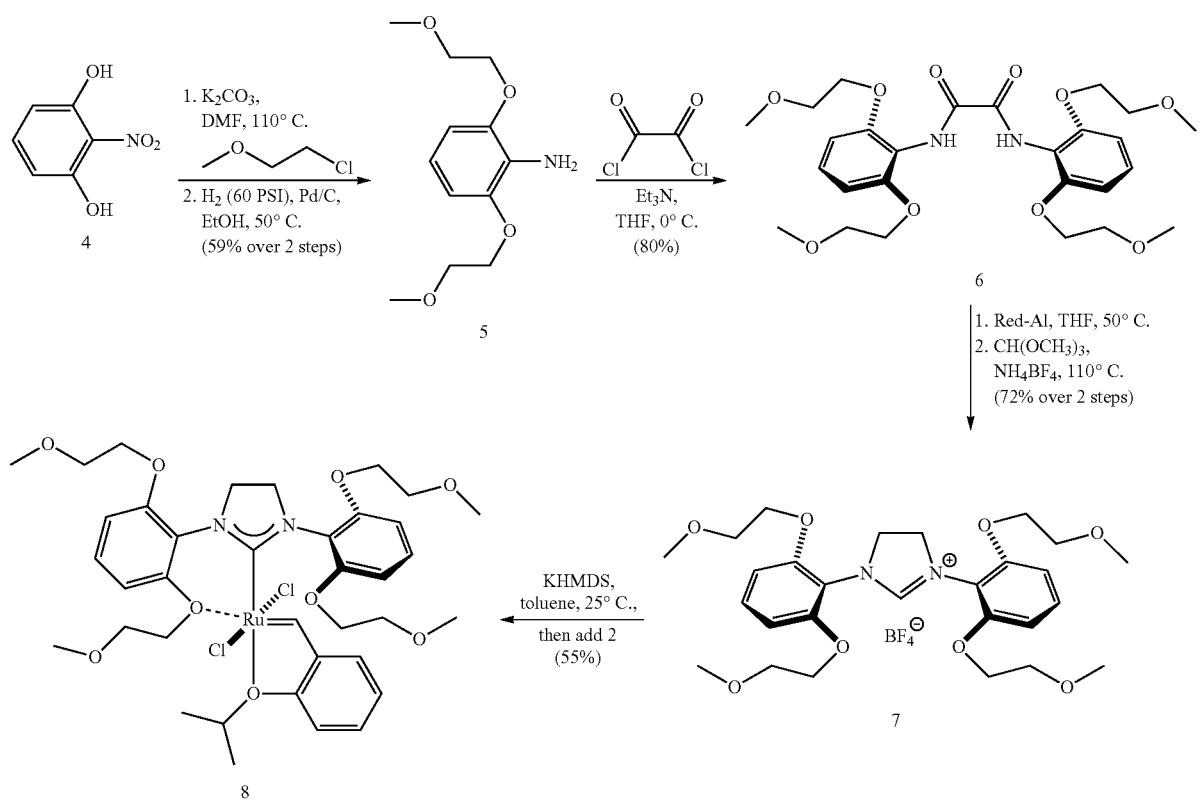

The imidazolinium 7, catalyst 8, and decomposition compound 9 were each analyzed by x-ray crystallography. The x-ray quality crystals were grown by vapor to liquid diffusion of alkanes into concentrated sample solutions. They are all shown with thermal ellipsoids at 50% probability. The crystal structure of imidazolinium 7 reveals that the polyether arms flare out away from each other to minimize steric repulsion, thus adopting the propeller geometry seen below. The favored conformation might also involve O→H electronic interactions because the acidic proton H1 is fairly close to a single ortho O on each half of the NHC ligand (2.80 Å for H1-O3 and 2.81 Å for H1-O7).

The crystal structure of catalyst 8 shown below reveals that one of the NHC aromatic rings is rotated around the N1-C11 bond by 48.8° with respect to the heterocycle plane, and the heterocycle is rotated around the C1-Ru1 bond by 43.7° with respect to the $C_{NHC}$—Ru=$C_{alkylidene}$ plane (C1-Ru1-C51). These combined twisting effects position a single ortho oxygen close enough to Ru for coordination to occur, with an O1→Ru1 distance of 2.54 Å. As a result, the catalyst adopts an octahedral-like geometry to accommodate this additional interaction. This differs from the distorted trigonal bipyramidal geometry of the commercial catalyst 3 in which both NHC aromatic rings are nearly perpendicular to the heterocycle plane (~90°) and the heterocycle is closely aligned with the $C_{NHC}$—RU=$C_{alkylidene}$ plane (~0°).

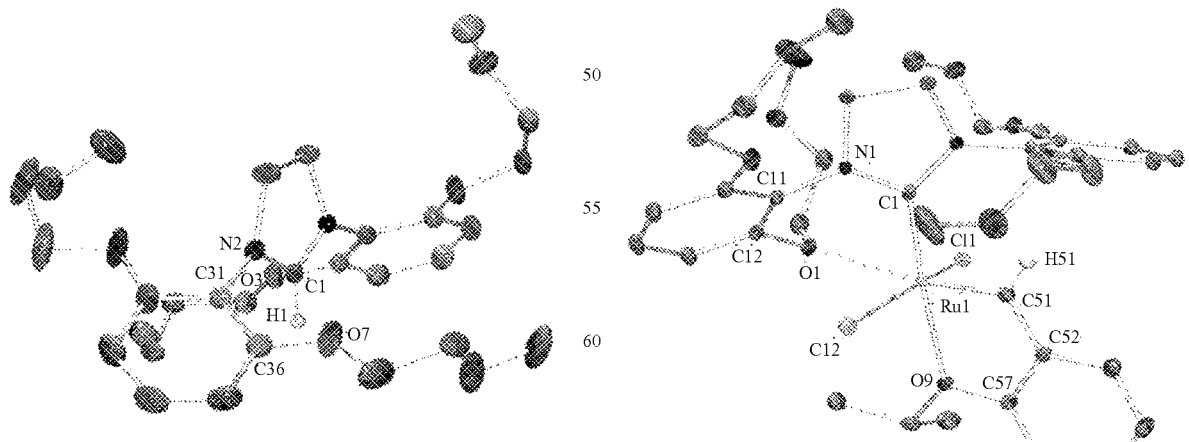

The crystal structure of catalyst 8 provides evidence for O→Ru coordination in the solid state. However, the NHC has much more freedom of motion while in solution, so the O→Ru interaction could reversibly alternate between the metal and each of the polyether arms. The zoom-in partial 135 DEPT $^{13}$C NMR spectra shown below reveals that imidazolium 7 and catalyst 8 each generate only 3 signals with inverted intensity. These signals correspond to the methylene carbons ($CH_2$) of each molecule (labeled as A, B, C). This indicates that all 4 of the polyether arms remain equivalent on the NMR timescale, thus preserving the symmetry of the NHC ligand. If the polyether arms of catalyst 8 participate in O→Ru coordination but remain equivalent in solution, then they must take turns reversibly interacting with Ru faster than the NMR timescale, and the NHC ligand must be able to freely rotate around the $C_{NHC}$—Ru axis ($C_1$—$Ru_1$).

When catalyst 8 is treated with 1-hexene, it performs cross metathesis on the substrate to generate cis and trans 5-decene in addition to ethylene gas. However, catalyst 8 eventually decomposes into the dinuclear compound 9 shown below if the substrate is added in large excess. The rapid progress of the reaction is easy to monitor visually because the dark green catalyst 8 quickly transforms into the bright orange compound 9 accompanied by intense bubbling from ethylene production. The reaction was performed in a glovebox, and typically appeared complete within about 5-30 min. depending on the solvent and the ratio of catalyst to substrate. The extent of 8→9 conversion can be quantified by comparing the integrations of alkylidene protons in the $^1$H NMR spectra ($C_6D_6$): 18.15 ppm for catalyst 8 and 15.77 ppm for dinuclear compound 9, which is shown in FIG. 11.

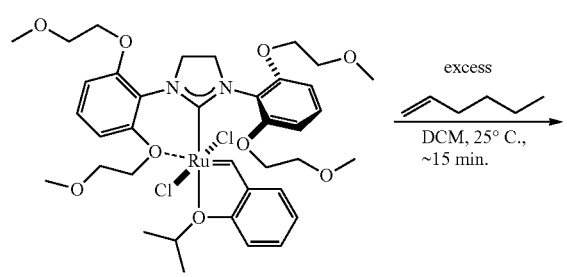

8

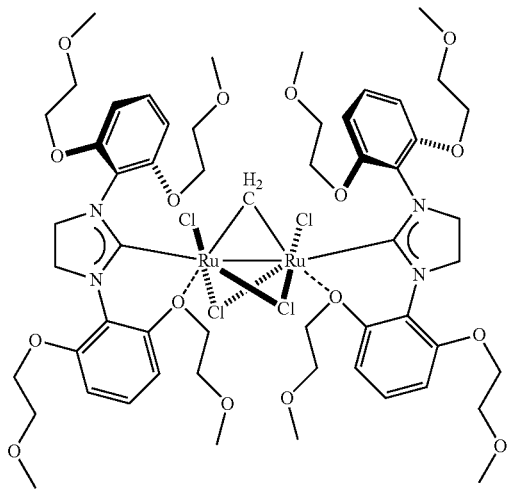

9

The crystal structure of decomposition compound 9 shown below reveals a dinuclear species which contains a single bridging methylidene (Ru—$CH_2$—Ru). Each half of the compound's bimetallic center is also covalently bound through two bridging chlorines and a strong Ru—Ru bond over 2.59 Å. Both NHC ligands still adopt a conformation which appears very similar to the intact catalyst 8. Each NHC contributes a single ortho O→Ru interaction which rotates the plane of the corresponding polyether-substituted aromatic ring away from perpendicular to the heterocycle plane. The O1→Ru1 coordination over 2.20 Å rotates the participating aromatic ring around N1-C11 by 47.7° with respect to the heterocycle and the O11→Ru2 coordination over 2.23 Å rotates the participating aromatic ring around N3-C61 by 43.5° with respect to the heterocycle. In contrast, the non-participating polyether-substituted aromatic rings remain nearly perpendicular to the heterocycle plane. Although the crystal structure of 9 contains some large ellipsoids due to disorder, the bimetallic core of the compound is well defined.

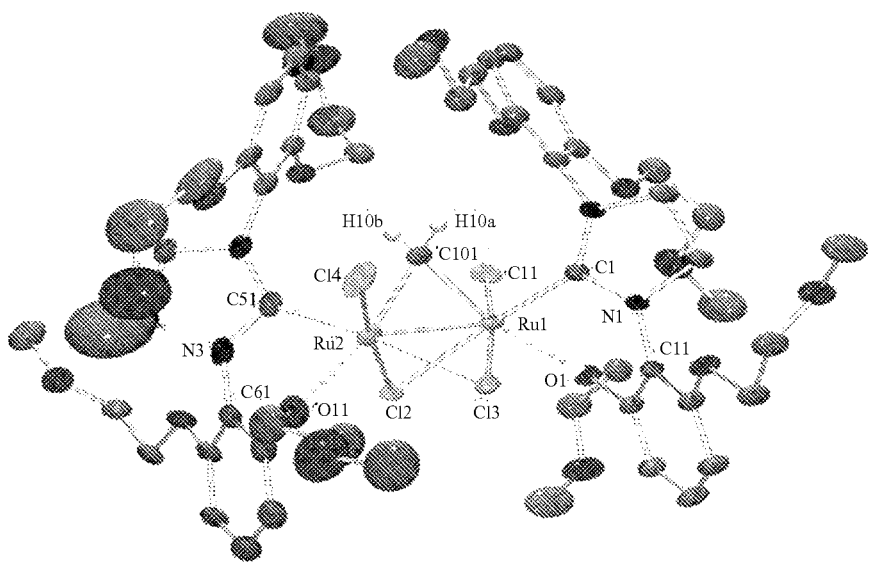

The proposed decomposition pathway leading to the formation of dinuclear compound 9 is shown below. The pre-catalyst 8 is transformed into the active catalyst methylidene 8a, and this is the propagating species which repeats the catalytic cycle by performing cross metathesis on 1-hexene. Each successful round of metathesis generates either cis or trans 5-decene in addition to a molecule of ethylene which then competes with the substrate 1-hexene for coordinating to methylidene 8a as the π-complex 8b prior to forming the metallacyclobutane 8c. The 14-electron Ru center of a metallacyclobutane is electron deficient and sterically wide-open, thus making it vulnerable to decomposition reactions which provide the metal with additional electron density.[16] Metallacyclobutane 8c can undergo a retro-[2+2] cycload- dition to reform the active catalyst methylidene 8a and an alkene product (productive metathesis), or it can proceed down a pathway of decomposition via β-hydride elimination to afford 8d. Compound 8d no longer contains an alkylidene and is now metathesis inactive, but it can still decompose further. Reductive elimination of propene affords the π-complex 8e, and then dissociation of propene generates the "naked Ru" 8f. Methylidene 8a attacks the "naked Ru" 8f to afford the dinuclear decomposition compound 9. The final reaction generates 4 new covalent bonds between the two halves of compound 9 and may involve several steps. Each repetition of this decomposition pathway destroys 2 equivalents of active catalyst.

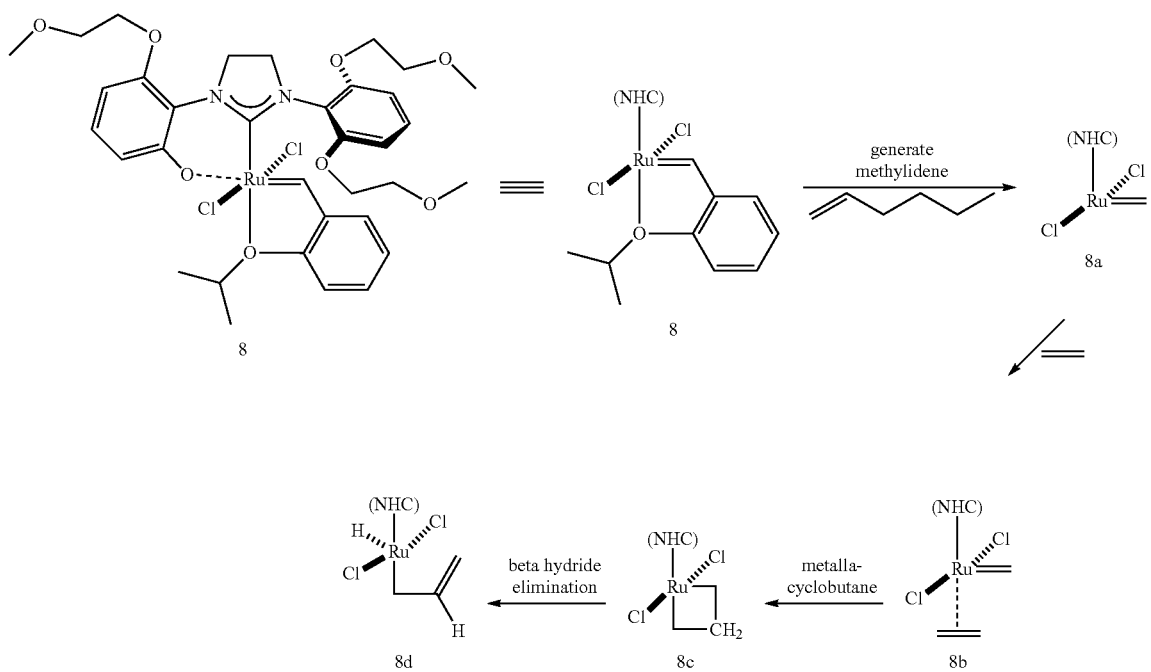

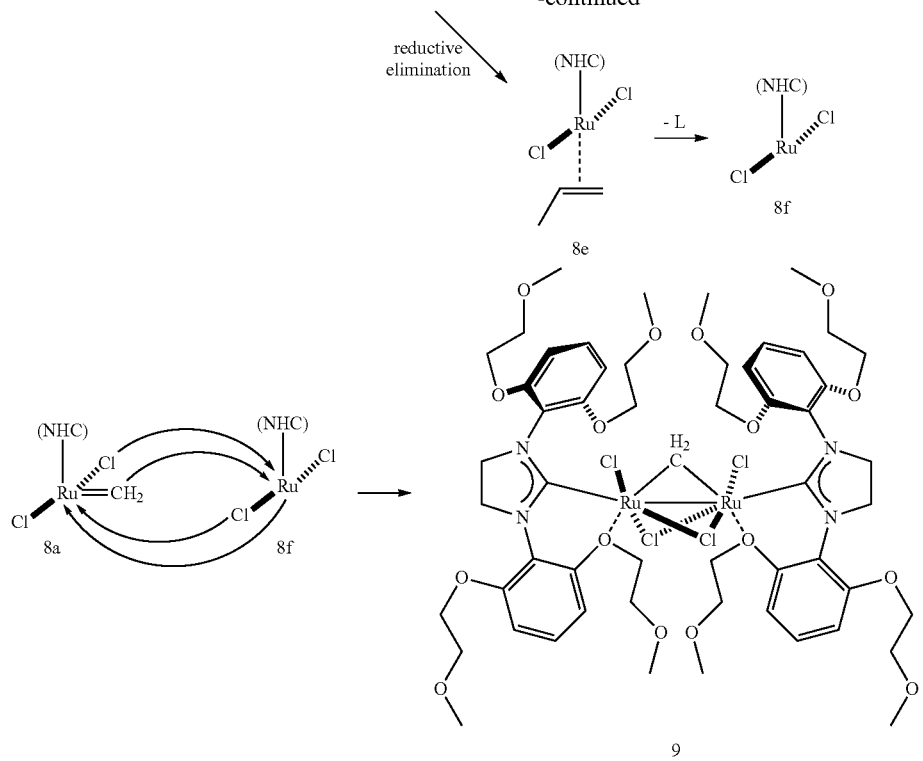

The initial purpose of the excess 1-hexene reaction was not to destroy the catalyst, but rather to capture a resting state (such as the methylidene 8a or metallacyclobutane 8c) which was stabilized by O→Ru←O chelation. Instead, we obtained the dinuclear compound 9 which provided information about decomposition. The key step in the proposed pathway involves β-hydride elimination from metallacyclobutane 8c, ultimately leading to compound 9. The stabilizing effect of O→Ru coordination may protect this species from further decomposition under these conditions. Therefore, functionalizing the aromatic rings of the NHC ligand with electron donating polyether arms enabled us to successfully capture dinuclear compound 9 at the bridging methylidene (Ru—CH$_2$—Ru) stage before it decomposed even further. Treating catalyst 8 with either styrene or ethylene afforded the same decomposition compound 9 as determined by NMR. This result can be explained by the universal catalytic role proposed for methylidene 8a regardless of the alkene substrate.

The activity of catalyst 8 was evaluated by standard olefin metathesis screening assays and then compared with the commercial catalyst 3. Both catalysts were tested for ring-closing metathesis (RCM) with diethyl diallylmalonate (DEDAM, 10) and for ring-opening metathesis polymerization (ROMP) with 1,5-cyclooctadiene (COD, 12). The % conversion was calculated by comparing the integration of methylene protons in the substrate with those in the product via $^1$H NMR. These reactions serve as powerful yet convenient methods for testing catalyst performance because they are simple to perform, the starting materials are cleanly converted to a single product, and the reaction progress can easily be monitored over time by NMR.

A graph which compares catalysts 3 and 8 at performing the RCM of DEDAM 10 into cycloalkene 11 is shown in FIG. 3. Catalyst 8 approaches completion much faster than the commercial catalyst 3. However, both eventually reach about 95-100% conversion of substrate into product at this level of catalyst loading if given enough time. A very different situation is illustrated by the graph below which compares catalysts 3 and 8 at performing the ROMP of COD 12 into polymer 13, as shown in FIG. 4. Catalyst 3 reaches almost total completion in under 10 min. while catalyst 8 is much slower and plateaus at only ~50% conversion after many hours.

Catalysts 3 and 8 display dramatically different kinetic profiles depending on the type of olefin metathesis reaction. However, changing reaction rates was not our primary objective because the goal of this work was to achieve higher TON by thwarting decomposition. The ROMP performance of catalyst 8 did not appear promising, so it was not tested extensively. The RCM experiments were repeated at lower catalyst loadings of 0.001 mol % and allowed to run for over 12 h before calculating the % conversion by NMR. Maximum TON of 22,300 were achieved for catalyst 3 whereas only 17,200 were achieved for catalyst 8. Therefore, our strategy of functionalizing the NHC ligand with polyether arms was not successful at increasing the stability of reactive catalyst intermediates, otherwise the TON should have increased.

In summary, a novel $2^{nd}$ generation Hoveyda-Grubbs catalyst 8 with an NHC ligand bearing polyether arm has been disclosed herein. The crystal structure of imidazolinium 7 revealed a propeller geometry which minimizes steric repulsion. The crystal structure of catalyst 8 revealed a single O→Ru interaction between the metal and NHC which contorts the conformation adopted in the solid state. However, each of the polyether arms of 8 remains equivalent on the NMR timescale while in solution. The crystal structure of dinuclear compound 9 revealed a bridging methylidene (Ru—CH$_2$—Ru) for which a reasonable decomposition mechanism was proposed. Although catalyst 8 and decomposition compound 9 both display O→Ru coordination in the solid state, neither provide evidence of a polyether arm wrapping around the metal center via O→Ru←O chelation as we had intended. Catalyst 8 did not appear well suited for ROMP, but it did display an unexpected large rate enhancement for RCM. Unfortunately, our strategy did not increase the maximum TON achieved for RCM. This work has provided further insight into catalyst structure, behavior in solution, decomposition, and olefin metathesis activity. Hopefully these results will assist in future catalyst design. Preventing decomposition is the key to prolonging the lifetime of olefin metathesis catalysts, and work is underway in our group to develop such catalysts.

Experimental Methods

General Methods

All air-sensitive manipulations were performed in oven-dried glassware under inert conditions using standard Schlenk techniques or a glovebox containing an atmosphere of purified argon (BIP). Solvents for air-sensitive reactions were dried and degassed prior to use. Tetrahydrofuran (THF) and toluene were dried using sodium/benzophenone ketyl followed by static vacuum distillation via bulb-to-bulb. Pentane, hexanes, 1-hexene, dichloromethane (DCM), and dichloroethane (DCE) were dried using calcium hydride ($CaH_2$) followed by static vacuum distillation via bulb-to-bulb. Solvents were degassed via freeze-pump-thaw or sparging with argon after their distillation from the drying agent, and then stored over 4 Å molecular sieves for at least 12 h prior to use (3 Å molecular sieves were used for DCM and DCE). Molecular sieves were "activated" (dehydrated) by heating at ~200° C. under a vacuum of ~25 mtorr for several hours, until the pressure gauge finally dropped back down to its equilibrium reading. The NMR solvents $C_6D_6$ and $CD_2Cl_2$ were degassed and then stored over 4 Å molecular sieves in a glovebox. Diethyl diallylmalonate (DEDAM, 10) and 1,5-cyclooctadiene (COD, 12) were purified by standard vacuum distillation using minimal heat (40-60° C. at ~25 mtorr). All other reagents were used as received. Elemental analysis was performed at the ALS Environmental Laboratory in Tucson, Arizona. X-ray diffraction was performed at the X-ray Crystallography Facility of the California Institute of Technology in Pasadena, California. NMR spectra were recorded on a Varian 400 MHz spectrometer running VnmrJ or a Bruker 400 MHz spectrometer running TopSpin. Chemical shifts are reported in parts per million (ppm) downfield from tetramethylsilane (TMS) with reference to internal solvent for $^1H$ NMR and $^{13}C$ NMR spectra. Peak abbreviations are used as follows: s=singlet, d=doublet, t=triplet, m=multiplet, br=broad.

Technique for Purifying Samples Suitable for Elemental Analysis

Samples were prepared for elemental analysis by either crystallization or column chromatography. For the intermediates 4.1, 5, 6, and 6.1: crystallization was achieved by the slow cooling of hot saturated solutions to afford crystals which were easy to collect, wash on a frit, and dry under vacuum to afford a sufficiently pure sample. Column chromatography was used to purify imidazolinium 7 (silica gel, 9/1 of ethyl acetate/isopropanol) and catalyst 8 (silica gel, gradient from 1/1 to 1/9 of hexanes/ethyl acetate), with only the middle fractions being saved for elemental analysis. Any purified samples that still appeared contaminated with dust, grease, glass, or some other form of debris, were dissolved and then gently filtered through a pipet plugged with glass fiber filter paper before solvent removal under vacuum.

Synthesis

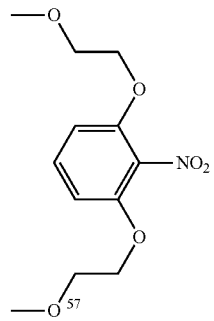

1,3-bis(2-methoxyethoxy)-2-nitrobenzene (4.1)

A round bottom flask was charged with 2-nitroresorcinol 4 (11.05 g, 71.24 mmol), KI (12.40 g, 74.70 mmol), and $K_2CO_3$ (21.31 g, 154.2 mmol). DMF (250 mL) was added followed by 2-chloroethylmethylether (18.0 mL, 197 mmol). A reflux condenser was attached, and the reaction was stirred at 110° C. for 48 h. The solvent was removed under vacuum to give a dark red muddy residue which was then transferred to a separatory funnel with DCM and water. The DCM was collected and the aqueous phase extracted with DCM (2×100 mL). The pooled extracts were washed once with aqueous $NaHCO_3$ (200 mL, 10 w %), dried with $Na_2SO_4$, filtered through celite, and the solvent was then removed under vacuum to give a yellow oil. This was dissolved in a boiling solution of minimal methanol and then slowly cooled to −20° C. to give the nitro product 4.1 (13.02 g, 48.02 mmol) as pale beige plates in 67% yield.

$^1H$ NMR (400 MHz, $CDCl_3$): δ 3.40 (s, 6H), 3.71 (t, 4H), 4.19 (t, 4H), 6.66 (d, 2H), 7.29 (t, 1H)

CHN elemental analysis for $C_{12}H_{17}NO_6$—Calculated: C, 53.13%, H, 6.32%, N, 5.16%, Found: C, 53.03%, H, 6.23%, N, 5.09%.

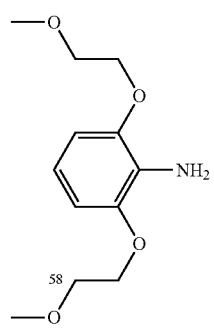

2,6-bis(2-methoxyethoxy)aniline (5)

A porter vessel was charged with compound 4.1 (12.52 g, 46.18 mmol), 10 w % Pd/C (1.80 g, 1.69 mmol), and ethanol (100%, 60 mL) which had been recently sparged with argon. The vessel was attached to a tank of hydrogen, vented three times, and the reaction was then stirred under 60 PSI of $H_2$ at 50° C. for 72 h. The cloudy black mixture was filtered through celite, and the solvent was then removed under vacuum to give a dark yellow oil. This was dissolved in a boiling solution of THF/hexanes and then slowly cooled to −20° C. to give the aniline product 5 (9.83 g, 40.8 mmol) as waxy white plates in 88% yield.

¹H NMR (400 MHz, CDCl₃): δ 3.44 (s, 6H), 3.74 (t, 4H), 3.96 (br s, 2H), 4.14 (t, 4H), 6.54 (d, 2H), 6.62 (t, 1H)

CHN elemental analysis for C₁₂H₁₉NO₄—Calculated: C, 59.73%, H, 7.94%, N, 5.81%, Found: C, 59.86%, H, 7.97%, N, 5.75%.

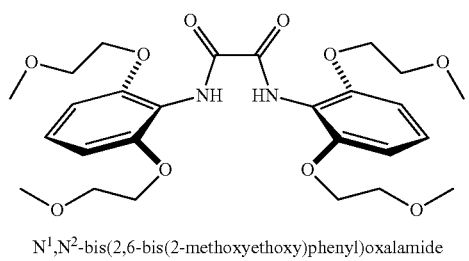

N¹,N²-bis(2,6-bis(2-methoxyethoxy)phenyl)oxalamide

A round bottom flask was charged with compound 5 (7.80 g, 32.4 mmol), THF (200 mL), and triethylamine (5.0 mL, 36 mmol). The flask was cooled in an ice bath, and then oxalyl chloride (2.5 mL, 29 mmol) was injected, instantly generating a thick white precipitation. The reaction was stirred for 12 h and allowed to slowly warm to room temperature. The excess acyl chloride was quenched by the slow addition of methanol (10 mL), and the solvent was then removed under vacuum to give a pale brown solid. This was dissolved in minimal DCM, placed in an ice bath, and then the slow addition of a large volume of hexanes via an addition funnel triggered the precipitation of the oxalamide product 6 (6.96 g, 13.0 mmol) as a white powder in 80% yield.

¹H NMR (400 MHz, CDCl₃): δ 3.41 (s, 12H), 3.71 (t, 8H), 4.16 (t, 8H), 6.63 (d, 4H), 7.16 (t, 2H), 8.87 (s, 2H)

CHN elemental analysis for C₂₆H₃₆N₂O₁₀—Calculated: C, 58.29%, H, 6.76%, N, 5.22%, Found: C, 58.41%, H, 6.75%, N, 5.22%.

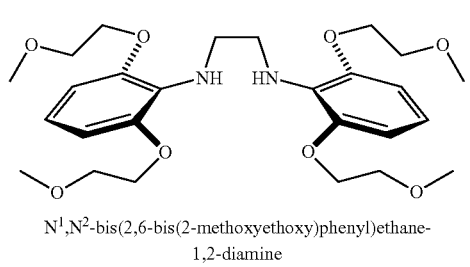

N¹,N²-bis(2,6-bis(2-methoxyethoxy)phenyl)ethane-1,2-diamine

A round bottom flask was charged with compound 6 (6.51 g, 12.1 mmol) and THF (200 mL), then placed in an ice bath. A solution of 60 w % red al® in toluene (35.0 mL, 108 mmol) was injected, and the reaction was stirred at 60° C. for 20 h. The flask was placed in an ice bath, and the excess hydride reducing agent was then quenched by the slow addition of aqueous KOH (30 mL, 20 w %) followed by filtering through celite. The filtrate was washed with aqueous Na₂CO₃ (2×100 mL, 10 w %), dried with Na₂SO₄, filtered through celite, and the solvent was then removed under vacuum to give a pale pink solid. This was dissolved in a boiling solution of THF/hexanes and then slowly cooled to −20° C. to give the diamine product 6.1 (4.79 g, 9.42 mmol) as fluffy white needles in 78% yield.

¹H NMR (400 MHz, C₆D₆): δ 3.11 (s, 12H), 3.39 (t, 8H), 3.73 (br s, 4H), 3.87 (t, 8H), 4.74 (s, 2H), 6.51 (d, 4H), 6.71 (t, 2H)

CHN elemental analysis for C₂₆H₄₀N₂O₈—Calculated: C, 61.40%, H, 7.93%, N, 5.51%, Found: C, 59.93%, H, 8.06%, N, 5.36%.

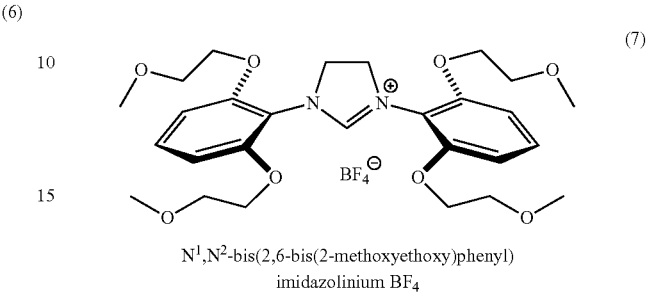

N¹,N²-bis(2,6-bis(2-methoxyethoxy)phenyl) imidazolinium BF₄

A round bottom flask was charged with compound 6.1 (4.50 g, 8.85 mmol), NH₄BF₄ (1.55 g, 14.8 mmol), and trimethyl orthoformate (100 mL). A reflux condenser was attached, and the reaction was stirred at 110° C. for 16 h. The mixture was cooled to room temperature, filtered through celite, and the solvent was then removed under vacuum to give a pale orange solid. This was dissolved in a boiling solution of isopropanol/hexanes, then slowly cooled to room temperature to give the imidazolinium product 7 (4.96 g, 8.18 mmol) as large white needles in 92% yield. Crystals of imidazolinium 7 suitable for x-ray diffraction were obtained by the slow diffusion of pentane vapors into a saturated DCM solution at 0° C. Note: the crude material can also be easily purified by column chromatography (silica gel, 9/1 of ethyl acetate/isopropanol, $R_f$~0.5).

¹H NMR (400 MHz, CDCl₃): δ 3.24 (s, 12H), 3.73 (t, 8H), 4.24 (t, 8H), 4.53 (s, 4H), 6.72 (d, 4H), 7.33 (t, 2H), 8.44 (s, 1H)

¹³C NMR (100 MHz, CDCl₃): δ 50.99, 58.73, 68.98, 70.53, 106.53, 114.28, 130.90, 154.11, 161.94

CHN elemental analysis for C₂₇H₃₉BF₄N₂O₈—Calculated: C, 53.48%, H, 6.48%, N, 4.62%, Found: C, 53.24%, H, 6.67%, N, 4.63%.

Catalyst 8

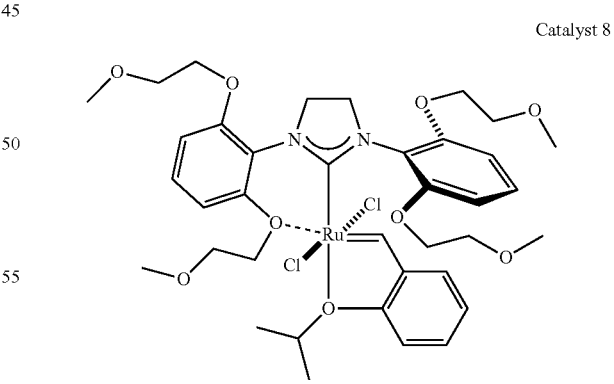

In an argon glovebox: a round bottom flask was charged with compound 7 (3.75 g, 6.19 mmol), KHMDS (1.20 g, 6.02 mmol), and toluene (100 mL). After stirring the reaction at room temperature for 2 h, the 1ˢᵗ generation Hoveyda-Grubbs catalyst 2 (3.45 g, 5.74 mmol) was then added to the mixture and stirred for an additional 12 h. The flask was then removed from the glovebox, its contents transferred to a separatory funnel, and washed with water (2×50 mL). The toluene solution was dried with $Na_2SO_4$, filtered through celite, and then the solvent was removed under vacuum to give a very dark blackish green solid. This was purified by column chromatography (silica gel, gradient from 1/1 to 9/1 of ethyl acetate/hexanes) to afford a dark green solid. The brightly colored product was monitored visually without needing to TLC the fractions. The resulting solid was then dissolved in minimal DCM, placed in an ice bath, stirred gently, and the very slow addition of hexanes via an addition funnel then triggered the precipitation of the $2^{nd}$ generation Hoveyda-Grubbs catalyst 8 (3.42 g, 4.08 mmol) as a green microcrystalline powder in 60% yield based on compound 2 or 55% yield based on compound 7. Crystals of catalyst 8 suitable for x-ray diffraction were obtained by the slow diffusion of pentane vapors into a saturated DCM solution at 0° C.

$^1$H NMR (400 MHz, $C_6D_6$): δ 1.53 (d, 6H), 3.21 (s, 12H), 3.58-3.62 (m, 4H), 3.77-3.82 (m, 4H), 4.09 (s, 4H), 4.23-4.27 (m, 8H), 4.60 (septet, 1H), 6.48 (d, 1H), 6.62 (d, 4H), 6.75 (t, 1H), 7.05 (t, 2H), 7.18 (t, 1H), 7.37 (d, 1H), 18.12 (s, 1H)

$^{13}$C NMR (100 MHz, $C_6D_6$): δ 21.47, 50.87, 58.44, 58.47, 68.97, 71.16, 74.17, 74.20, 108.29, 113.19, 121.74, 121.83, 123.29, 128.39, 145.78, 145.81, 153.08, 153.09, 157.06, 188.46, 211.05, 296.51

CHN elemental analysis for $C_{37}H_{51}Cl_2N_2O_9Ru$—Calculated: C, 52.92%, H, 6.12%, N, 3.34%, Found: C, 52.78%, H, 6.39%, N, 3.47%.

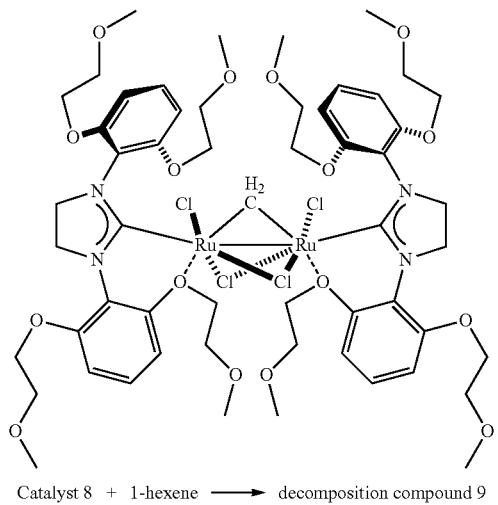

Catalyst 8 + 1-hexene ⟶ decomposition compound 9

In an argon glovebox: a round bottom flask was charged with catalyst 8 (200 mg) and DCM (8 mL). 1-hexene (15 mL) was slowly added, and the reaction was stirred at room temperature for 30 min. The green solution soon became a dark orange mixture with a black insoluble residue accompanied by intense bubbling from ethylene production. The solvent was then removed under vacuum to afford sticky brown solids suspended in a clear liquid. This was dissolved in minimal DCM, and the solution was then carefully decanted away from the dark insoluble residue into a beaker. The slow addition of a large volume of hexanes (~20 mL) triggered the precipitation of decomposition compound 9 as an orange powder which was then washed thoroughly with hexanes on a filter frit. Crystals of compound 9 suitable for x-ray diffraction were obtained by the slow diffusion of hexanes vapors into a saturated DCE solution at −20° C. Note: this species is very air sensitive, and it will also decompose if stored in solution for several days at room temperature even in a glovebox.

$^1$H NMR (400 MHz, $C_6D_6$): δ 2.94 (s, 6H), 3.08 (s, 6H), 3.10 (s, 6H), 3.20-3.28 (m, 8H), 3.36 (s, 6H), 3.51-3.58 (m, 8H), 3.69-3.78 (m, 4H), 3.80-3.87 (m, 8H), 3.91-3.99 (m, 2H), 4.04-4.18 (m, 6H), 4.61-4.78 (m, 4H), 6.50-6.58 (m, 6H), 6.72 (t, 2H), 6.99 (d, 2H), 7.18 (t, 2H), 15.77 (s, 2H)

$^{13}$C NMR (100 MHz, $C_6D_6$): δ 42.1, 48.5, 49.3, 52.3, 53.0, 58.0, 58.3, 58.4, 58.8, 59.0, 59.1, 59.2, 59.6, 60.2, 60.4, 67.5, 68.1, 68.2, 68.5, 70.8, 70.9, 71.1, 71.3, 71.5, 71.7, 72.0, 72.1, 100.4, 103.8, 103.9, 105.0, 105.2, 109.3, 117.1, 119.7, 122.0, 122.9, 124.2, 124.7, 127.3, 127.4, 127.8, 127.9, 128.5, 128.7, 151.4, 152.7, 157.3, 157.5, 157.9, 158.2, 167.4, 216.0, 216.3, 282.3

Testing Catalyst Performance

Monitoring Kinetics for the RCM of DEDAM

In an Ar glovebox, a $2.6 \times 10^{-4}$ M stock solution was prepared by dissolving catalyst 8 (5.5 mg, 0.0066 mmol) in DCM (25 mL). A micro syringe was charged with 190 μL of this solution. An NMR tube with a screw-cap septum top was charged with DEDAM 10 (12 μL, 50 μmol) and $CD_2Cl_2$ (260 μL). The NMR tube and syringe were then removed from the glovebox. The NMR spectrometer was equilibrated at 30° C., and then a quick spectrum was obtained to verify the purity of the substrate. The catalyst solution was then injected into the tube, the contents were inverted several times to aid in mixing, and the tube was then reinserted into the spectrometer. The sample was heated at 30° C. for 1 hour and $^1$H NMR spectra were collected at 2 min. intervals. The % conversion was determined by comparing the ratio of integrals corresponding to the methylene protons in the substrate at δ 2.6 (t) with those in the product at δ 3.0 (s). This procedure provides 0.1 mol % catalyst loading in a 0.1 M solution of DEDAM. Monitoring kinetics at different concentrations was achieved by creating new stock solutions and adjusting the volume of $CD_2Cl_2$ so that the total volume always equals ~500 μL in order to maintain a 0.1 M concentration of DEDAM 10.

Determining Maximum TON for the RCM of DEDAM

In an Ar glovebox, a micro syringe was charged with 19 μL of a $2.6 \times 10^{-5}$ M stock solution of catalyst 8 in DCM. A tall vial with a stir bar and a cap punctured with a needle was charged with DEDAM 10 (12 μL, 50 μmol) and $CD_2Cl_2$ (470 μL). The vial and syringe were then removed from the glovebox. The catalyst solution was injected into the vial, and the reaction was stirred at 30° C. for many hours. Aliquots of the reaction were taken every few hours to calculate the % conversion by $^1$H NMR. The reaction was deemed complete when the % conversion no longer increased between time intervals, typically requiring at least 12 hours. This procedure provides 0.001 mol % catalyst loading in a 0.1 M solution of DEDAM, and the highest TON were achieved at this level of loading. Lowering the concentration of catalyst even further than this resulted in diminished TON.

TABLE S1

Comparison of catalysts with the highest TON achieved
for the RCM of 0.1M DEDAM in $CD_2Cl_2$ at 30° C.

| Catalyst | Loading (mol %) | Time (hours) | Conversion (%) | TON |
|---|---|---|---|---|
| 3 | 0.001 | 14 | 22.3 | 22,300 |
| 8 | 0.001 | 12 | 17.2 | 17,200 |

Monitoring Kinetics for the ROMP of COD

In an Ar glovebox, a 0.011 M stock solution was prepared by dissolving catalyst 8 (9.2 mg, 0.011 mmol) in DCM (1 mL). A micro syringe was charged with 180 μL of this solution. An NMR tube with a screw-cap septum top was charged with COD 12 (25 μL, 200 μmol) and $CD_2Cl_2$ (195 μL). The NMR tube and syringe were then removed from the glovebox. The NMR spectrometer was equilibrated to 30° C., and then a quick spectrum was obtained to verify the purity of the substrate. The catalyst stock solution was then injected into the tube, the contents were inverted several times to aid in mixing, and the tube was then reinserted into the spectrometer. The sample was heated at 30° C. for 1 hour and $^1$H NMR spectra were collected at 2 min. intervals. The % conversion was determined by comparing the ratio of integrals corresponding to the aliphatic protons in the substrate at δ 2.4 (s) with those in the product at δ 2.1 (m). This procedure provides 1 mol % catalyst loading in a 0.5 M solution of COD. Monitoring kinetics at different concentrations was achieved by creating new stock solutions and adjusting the volume of CD2Cl2 so that the total volume always equals ~400 μL in order to maintain a 0.5 M concentration of COD 12.

Determining Maximum TON for the ROMP of COD

In an Ar glovebox, a micro syringe was charged with 18 μL of a 0.011 M stock solution of catalyst 8 in DCM. A tall vial with a stir bar and a cap punctured with a needle was charged with COD 12 (25 μL, 200 μmol) and $CD_2Cl_2$ (355 μL). The vial and syringe were then removed from the glovebox. The catalyst solution was injected into the vial, and the reaction was stirred at 30° C. for many hours. Aliquots of the reaction were taken every few hours to calculate the % conversion by $^1$H NMR. The reaction was deemed complete when the % conversion no longer increased between time intervals, requiring 16 h for catalyst 8 and only about 0.25 h for catalyst 3. This procedure provides 0.1 mol % catalyst loading in a 0.5 M solution of COD, and the highest TON were achieved at this level of loading. Lowering the concentration of catalyst 8 even further than this resulted in diminished TON.

TABLE 2

Comparison of catalysts with the highest TON achieved
for the ROMP of 0.5M COD in $CD_2Cl_2$ at 30° C.

| Catalyst | Loading (mol %) | Time (hours) | Conversion (%) | TON |
|---|---|---|---|---|
| 3 | 0.1 | 0.25 | 100 | 1,000 |
| 8 | 0.1 | 16 | 59.3 | 593 |

X-Ray Crystallography

General Remarks

All crystal structures are shown with thermal ellipsoids at 50% probability. Counterions, solvent molecules, and hydrogen atoms are omitted for clarity. The only depicted hydrogens are H1 on imidazolinium 7, H51 on catalyst 8, and H10a and H10b on decomposition compound 9. The structures were drawn by obtaining coordinates with ORTEP 3 followed by image creation with POVray using the following parameters: style (ORTEP ellipsoids), ellipse style (plain), finish (shiny), and resolution of [1600×1200, AA 0.3], with the following color scheme: C (dark grey), H (light grey), Cl (green), N (blue), O (red), and Ru (purple). Crystal structure measurements of angle and distance were obtained with the program Mercury.

Technique for Growing Crystals Suitable for x-Ray Diffraction

The x-ray quality crystals were grown by the slow diffusion of alkane vapors into concentrated sample solutions using the "vial inside of a vial" method. The best crystals were obtained when the inner container was the bottom tip of a broken NMR tube (~2-4 cm long) that was filled ~25-50% full with the solution of sample to be crystallized. The broken NMR tubes were placed in a small base bath of 1:1:4 KOH:$H_2O$:isopropanol, swirled vigorously, and then allowed to soak for several hours. The base bath serves to polish the glass, thus removing any dust or shallow scratches on the surface which might accidentally favor the premature nucleation of crystals. After polishing the glass with base, it was thoroughly washed with water and then oven dried.

After dissolving the sample in either minimal DCM or DCE, the solution was then gently pipetted into the broken NMR tube, placed diagonally inside of a larger vial, and then a large excess of either pentane or hexanes was added to the outer container. Slanting the broken NMR tube at an angle inside of the larger container is essential for achieving slow solvent diffusion because the outer solvent will quickly ascend by capillary action if the walls of the inner and outer containers are pressed against each other. Crystals of 7 and 8 were grown inside of a refrigerator and allowed to sit still in a carefully padded region for at least 5 days before checking on the progress of crystallization. Crystals of decomposition compound 9 were grown inside of a glovebox freezer, and the cap of the vial was greased and tightly taped before removing it from the glovebox. The tightly sealed vials were stored inside of a well cushioned larger container deeply seated inside of an ice bucket during the ~1 h journey to the x-ray facility.

TABLE 3

| Crystal structure measurements for 7 | |
|---|---|
| C1—H1 | 0.950 Å |
| O3—H1 | 2.805 Å |
| O7—H1 | 2.811 Å |
| NEC plane × $Ar_1$ plane (N1-C11) | 60.69° |
| NEC plane × $Ar_2$ plane (N2-C31) | 66.71° |
| $Ar_1$ plane × $Ar_2$ plane (no axis) | 71.18° |

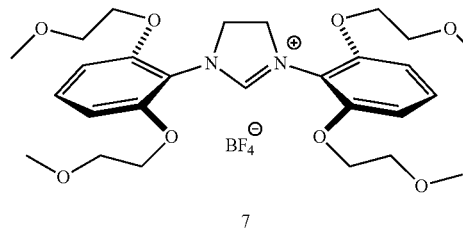

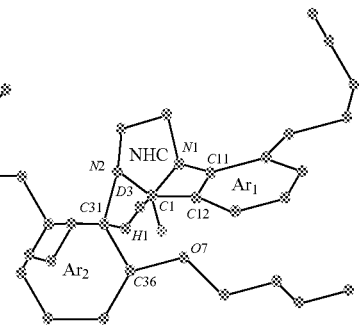

Special refinement details for imidazolium 7.

Low-temperature diffraction data (φ- and ω-scans) were collected on a Bruker AXS D8 VENTURE KAPPA diffractometer coupled to a PHOTON 100 CMOS detector with Mo $K_\alpha$ radiation (λ=0.71073 Å) from an IμS micro-source for the structure of compound 7. The structure was solved by direct methods using SHELXS and refined against $F^2$ on all data by full-matrix least squares with SHELXL-2014 using established refinement techniques. All non-hydrogen atoms were refined anisotropically. All hydrogen atoms were included into the model at geometrically calculated positions and refined using a riding model. The isotropic displacement parameters of all hydrogen atoms were fixed to 1.2 times the U value of the atoms they are linked to (1.5 times for methyl groups). All disordered atoms were refined with the help of similarity restraints on the 1,2- and 1,3-distances and displacement parameters as well as rigid bond restraints for anisotropic displacement parameters. Compound 7 crystallizes in the monoclinic space group $P2_1/n$ with one molecule in the asymmetric unit. Two of the ether groups were modeled as two components disorders.

TABLE 4

| Crystal structure measurements for 8 | |
|---|---|
| Ru1—C1 | 1.964 Å |
| Ru1=C51 | 1.834 Å |
| C51—H51 | 0.950 Å |
| H51—$Ar_2$ centroid | 3.017 Å |
| Ru1—O1 | 2.538 Å |
| Ru1—O9 | 2.313 Å |
| NHC plane × $Ar_1$ plane (N1-C11) | 48.83° |
| NHC plane × $Ar_2$ plane (N2-C31) | 86.26° |
| NHC plane × C1—Ru1—C51 plane (Ru1—C1) | 43.71° |

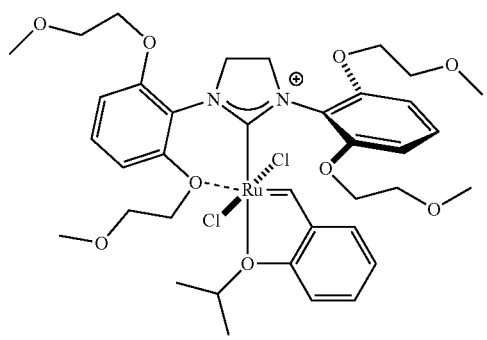

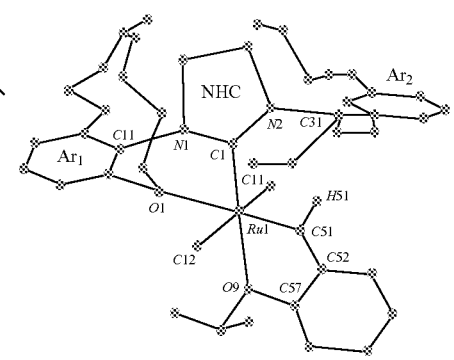

Special refinement details for catalyst 8.

Low-temperature diffraction data (φ- and ω-scans) were collected on a Bruker AXS D8 VENTURE KAPPA diffractometer coupled to a PHOTON 100 CMOS detector with Mo $K_\alpha$ radiation ($\lambda$=0.71073 Å) from an IμS micro-source. The structure was solved by direct methods using SHELXS and refined against $F^2$ on all data by full-matrix least squares with SHELXL-2014 using established refinement techniques. All non-hydrogen atoms were refined anisotropically. All hydrogen atoms were included into the model at geometrically calculated positions and refined using a riding model. The isotropic displacement parameters of all hydrogen atoms were fixed to 1.2 times the U value of the atoms they are linked to (1.5 times for methyl groups). All disordered atoms were refined with the help of similarity restraints on the 1,2- and 1,3-distances and displacement parameters as well as rigid bond restraints for anisotropic displacement parameters. Compound 8 crystallizes in the monoclinic space group P-1 with one molecule in the asymmetric unit along with one molecule of dichloromethane. The dichloromethane was disordered over two positions.

TABLE 5

Crystal structure measurements for 9

| | |
|---|---|
| Ru1—Ru2 | 2.585 Å |
| Ru1—C101 | 2.208 Å |
| Ru2—C101 | 2.209 Å |
| C101—H10a | 0.990 Å |
| C101—H10b | 0.990 Å |
| H10a—$Ar_3$ centroid | 3.592 Å |
| H10b—$Ar_4$ centroid | 3.337 Å |
| Ru1—C1 | 2.010 Å |
| Ru2—C51 | 2.020 Å |
| Ru1—O1 | 2.230 Å |
| Ru2—O11 | 2.214 Å |
| $NHC_1$ plane × $Ar_1$ plane (N2—C11) | 43.43° |
| $NHC_1$ plane × $Ar_3$ plane (N1—C31) | 87.24° |
| $NHC_2$ plane × $Ar_2$ plane (N3—C61) | 57.48° |
| $NHC_2$ plane × $Ar_4$ plane (N4—C81) | 79.05° |
| $NHC_1$ plane × $NHC_2$ plane (no axis) | 11.64° |

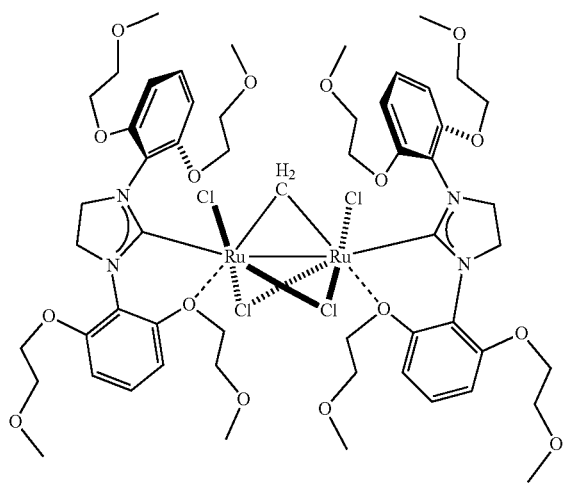

9

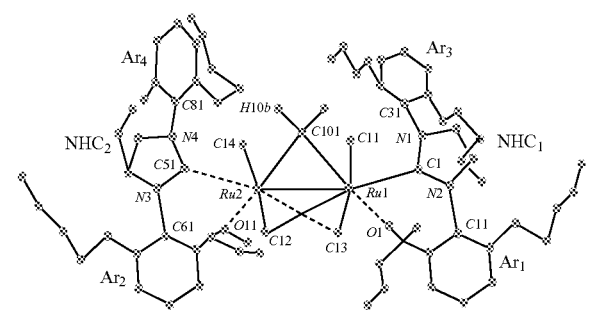

Special refinement details for decomposition compound 9

Low-temperature diffraction data (ϕ- and ω-scans) were collected on a Bruker AXS KAPPA APEX II diffractometer coupled to a APEX II CCD detector with graphite monochromated Mo K$_\alpha$ radiation (λ=0.71073 Å). The structure was solved by direct methods using SHELXS and refined against F$^2$ on all data by full-matrix least squares with SHELXL-2014 using established refinement techniques. All non-hydrogen atoms were refined anisotropically. All hydrogen atoms were included into the model at geometrically calculated positions and refined using a riding model. The isotropic displacement parameters of all hydrogen atoms were fixed to 1.2 times the U value of the atoms they are linked to (1.5 times for methyl groups). All disordered atoms were refined with the help of similarity restraints on the 1,2- and 1,3-distances and displacement parameters as well as rigid bond restraints for anisotropic displacement parameters. Compound 9 crystallizes in the monoclinic space group C2c with one molecule in the asymmetric unit along with four molecules of dichloroethane. One of the NHC ligands was disordered over two positions. It was refined with the help of enhanced rigid bond restraints in addition to the restraints listed above. One of the components of this disorder is located near a two-fold rotation axis, therefore the occupancies of the two components was fixed at a half. All dichloroethane molecules were refined with the help of similarity restraints on the 1,2- and 1,3-distances. The final structure contains a number of large ellipsoids as well as high residual electron density which indicates additional disorder in the solvent and NHC ligand. Refinement of additional disorder components was attempted, however, a stable refinement with more than two components could not be achieved. The hydrogen atoms bound to C101 could be found in the difference Fourier synthesis, however, they were included into the model at geometrically calculated positions and refined using a riding model.

TABLE 6

| Compound | Imidazolinium 7 | Catalyst 8 | Decomposition 9 |
|---|---|---|---|
| Empirical formula | C$_{27}$H$_{39}$BF$_4$N$_2$O$_8$ | C$_{38}$H$_{52}$Cl$_4$N$_2$O$_9$Ru | C$_{63}$H$_{94}$Cl$_{12}$N$_4$O$_{16}$Ru$_2$ |
| Molar mass | 606.41 g/mol | 923.68 g/mol | 1790.96 g/mol |
| Temperature | −173.0° C. | −173.0° C. | −173.0° C. |
| Color | Colorless | Green | Orange |
| Crystal system | Monoclinic | Triclinic | Monoclinic |
| Space group | P2$_1$/n | P-1 | C2/c |
| A | 11.9448(4) Å | 10.3106(5) Å | 35.7014(1) Å |
| B | 11.9131(4) Å | 11.0759(5) Å | 15.6927(7) Å |
| C | 21.3915(8) Å | 19.0127(8) Å | 29.8292(1) Å |
| α | 90° | 100.8352(16)° | 90° |
| β | 94.3257(13)° | 102.6027(16)° | 102.348(3)° |
| γ | 90° | 95.9461(16)° | 90° |
| Volume | 3035.33(18) Å$^3$ | 2057.32(16) Å$^3$ | 16325.3(13) Å$^3$ |
| Z | 4 | 2 | 8 |
| Density (calculated) | 1.327 g/cm$^3$ | 1.491 g/cm$^3$ | 1.457 g/cm$^3$ |
| Absorption coefficient | 0.112 mm$^{-1}$ | 0.695 mm$^{-1}$ | 0.823 mm$^{-1}$ |
| F(000) | 1280 | 956 | 7360 |
| Crystal size | 0.190 × 0.180 × 0.140 mm$^3$ | 0.250 × 0.150 × 0.150 mm$^3$ | 0.450 × 0.350 × 0.100 mm$^3$ |
| Radiation | Mo K$_\alpha$ (λ = 0.71073 Å) | Mo K$_\alpha$ (λ = 0.71073 Å) | Mo K$_\alpha$ (λ = 0.71073 Å) |
| 2Θ range for data collection | 2.418 to 30.514° | 2.249 to 36.368° | 1.529 to 30.508° |
| Index ranges | −17 <= h <= 17, −17 <= k <= 17, −30 <= l <= 30 | −17 <= h <= 16, −18 <= k <= 18, −31 <= l <= 31 | −50 <= h <= 50, −22 <= k <= 22, −42 <= l <= 41 |
| Reflections collected | 67775 | 98663 | 229503 |
| Independent reflections | 9242 [R(int) = 0.0592] | 19784 [R(int) = 0.0504] | 24912 [R(int) = 0.0581] |
| Completeness to Θ = 25.242° | 99.9% | 99.9% | 99.9% |
| Data/restraints/parameters | 9242/6/420 | 19784/79/521 | 24912/3002/1265 |
| Goodness-of-fit on F2 | 1.021 | 1.024 | 1.096 |
| Final R indexes [I >= 2σ (I)] | R1 = 0.0703, wR2 = 0.1726 | R1 = 0.0385, wR2 = 0.0683 | R1 =0.0631, wR2 = 0.1700 |
| Final R indexes [all data] | R1 = 0.1050, wR2 = 0.1928 | R1 = 0.0621, wR2 = 0.0743 | R1 =0.0905, wR2 = 0.1951 |
| Largest diff. peak/hole | 1.448 and −0.494 e.Å$^{-3}$ | 0.673 and −0.870 e.Å$^{-3}$ | 3.607 and −1.331 e.Å$^{-3}$ |
| Max. and min. transmission | 0.7467 and 0.6835 | 0.7471 and 0.7075 | 0.7464 and 0.6231 |

Example 4: Metathesis Data

Ring-Opening Metathesis Polymerization of 1,5-Cyclooctadiene

Sample Protocol for 1,000 Equiv. of COD

In an argon filled glovebox, a J-young NMR tube was charged with 1,5-cyclooctadiene (49.1 μL, 0.40 mmol, 0.5 M) and 0.75 mL of CD$_2$Cl$_2$. For the experiments run at 80° C., bromobenzene-d5 was used as the solvent. The sample was equilibrated in the spectrometer to the desired temperature before injection of catalyst stock solution (0.01844 M, 21.7 μL, 0.0004 mmol, 0.1 mol %). Conversion of COD starting material to poly-COD was determined by comparing the ratio of the integrals of the methylene protons in the substrate (δ 2.36) to those in the product (δ 2.09 & 2.04). For kinetic experiments, the sample was kept in the spectrometer throughout the duration of the experiment, and data points were collected at various time intervals. The experiments conducted with different catalyst loadings followed the same protocol with different amounts of catalyst.

TABLE 7

Comparison of max TON of various catalysts for the ROMP of .5M COD at 30° C. and 80° C. shown also in FIG. 5.

| Catalyst | Max TON at 30° C. | Max TON at 80° C. |
|---|---|---|
| Ru 704 (DIPP Me Ru) | 5,070 | >20,000 |
| Ru 690 (DIPP H) | <100 | 6200 |
| Grubbs 2 | — | 9,000 |
| Hoveyda-Grubbs 2 | — | >10,000 |

DIPP Methyl Pyridine Imidazolium Chloride (Hydrogens Omitted for Clarity)

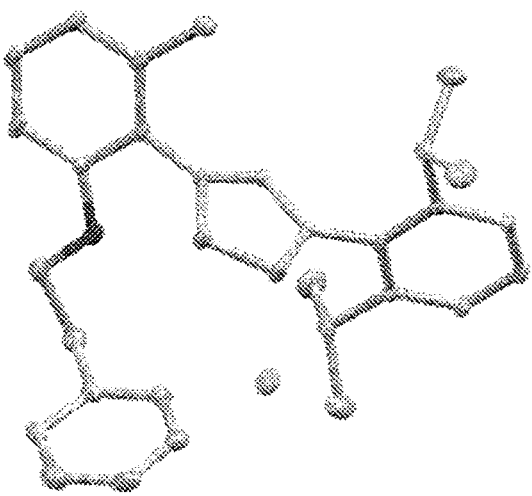

(Waltman, A. W.; Grubbs, R. H., *Organometallics* 2004, 23 (13), 3105-3107)

Self-Metathesis of 1-Decene

Sample Protocol for 10,000 Equiv. of 1-Decene

Catalyst stock solutions were prepared outside of the glovebox, in argon sparged and dry DCM. A 10-mL round-bottom flask was charged with 1-decene (5.00 mL, 26.41 mmol) and a stir bar. A water-cooled reflux condenser was attached and vented to an oil bubbler. The headspace was purged with argon for several minutes at a rate of ~2 bubbles/second while stirring. After equilibrating to the desired temperature in an oil bath, the condenser was temporarily removed, ensuring a positive pressure of argon, and catalyst Ru 704 stock solution (0.00582 M, 45.4 µL, 0.000265 mmol, 0.001 mol %) was injected, followed by immediate replacement of the condenser. A steady flow of argon was kept throughout the duration of the experiment. After 24 hours, the condenser was rinsed with hexanes and removed. The reaction was quenched with 0.1 mL of 1 M tris(hydroxymethyl)phosphine, followed by vigorous stirring overnight at 60-65° C. The crude mixture was repeatedly washed with $H_2O$ until the aqueous phase was colorless, followed by 0.5 M HCl, saturated $NaHCO_3$, and brine, to ensure complete removal of the catalyst before GC analysis. For the kinetic experiments, aliquots of 0.1 mL were taken from the reaction at various times, each worked up separately. The purified product mixture was diluted further with hexanes (~1:100) before analysis via GC. The experiments conducted with different catalyst loadings followed the same protocol with different molar amounts of catalyst and substrate.

TABLE 8

Comparison of TON of Ru 704 and Hoveyda-Grubbs 2 catalyst for self-metathesis of neat 1-decene at 100,000 equivalences of substrate, which is also shown in FIG. 6.

| Catalyst | Temperature (° C.) | Total Conversion (%) | TON |
|---|---|---|---|
| Ru 704 (DIPP Me) | 40 | 81.88 | 81,880 |
| | 55 | 83.96 | 83,960 |
| | 70 | 85.30 | 85,300 |
| Hoveyda-Grubbs 2 | 40 | 10.41 | 10,410 |
| | 55 | 8.71 | 8,710 |
| | 70 | 7.81 | 7,810 |

Ring-Closing Metathesis of Diethyl Diallylmalonate

Sample Protocol for 50,000 Equiv. of DEDAM

In an argon filled glovebox, an NMR tube was charged with DEDAM (181.3 µL, 0.750 mmol), 570 µL of toluene-d8, then catalyst Ru 704 stock solution (0.01 M, 1.5 µL, $1.5 \times 10^{-5}$ mmol, 0.002 mol %). The tube was promptly capped and inverted. An 18 G needle was used to vent the system prior to heating to the desired temperature outside of the glovebox. $^1$H NMR spectra were acquired until the activity ceased. The degree of conversion was determined by comparing the ratio of the integrals of the allyl methylene protons in the substrate ($\delta$ 2.72) to those in the product ($\delta$ 3.05).

TABLE 9

Activities of Ru 704 for RCM of 1M DEDAM at 10,000 and 50,000 equivalences of substrate, and varied temperatures, which is also shown in FIG. 7.

| Equivalences of substrate | Temperature (° C.) | % Conversion | TON |
|---|---|---|---|
| 1:10,000 | 50 | 70.70 | 7070 |
| | 70 | 91.40 | 9140 |
| 1:50,000 | 50 | 47.44 | 23,720 |
| | 70 | 66.29 | 33,145 |

Relative Stabilities in Decomposition Studies of C614 and C773 (Grubbs 2 Methylidene Complex)

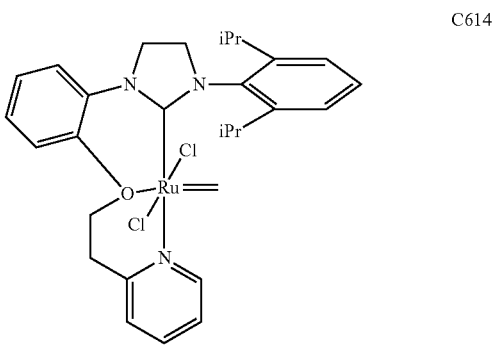

C614

-continued

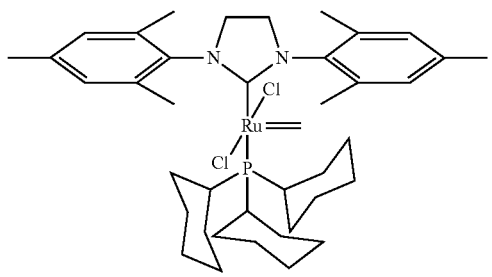

C773

TABLE 10

High turnover numbers in the ROMP of cyclooctadiene at 30° C. (in $CD_2Cl_2$) and at 80° C. ($C_6D_5Br$), which are represented in FIGS. 8, 9, and 10.

|  | 1:1,000 (30° C.) | 1:5,000 (30° C.) | 1:10,000 (30° C.) | 1:1,000 (80° C.) | 1:5,000 (80° C.) | 1:10,000 (80° C.) | 1:20,000 (80° C.) |
|---|---|---|---|---|---|---|---|
| Ru 648 (Mes-H) | TON <1 (24 hr+) | N/A | N/A | N/A | 3,900 (2 hr) | 5,900 (24 hr) | N/A |
| Ru 690 (DIPP-H) | <1 (24 hr+) | N/A | N/A | N/A | 4,050 (2 hr) | 6200 (24 hr) | N/A |
| Ru 662 (Mes-Me) | 1000 (50. Min) | 4550.8 (32 hr) | 5305 (32 hr) | 1,000 (<1 hr) | 5000 (5 min) | 10,000 (1 hr) | N/A |
| Ru 704 (DIPP-Me) | 1000 (50. Min) | 3102.5 (32 hr) | 5070 (32 hr) | 1,000 (<2.5 hr) | 5000 (15 min) | 10,000 (2.5 hr) | 20,000 (8 hr) |
| Grubbs 2 | 1000 (5. Min) | N/A | 10,000 (30 min) | N/A | 5000 (<1 min) | 9,088 (5 hr) | N/A |
| Hoveyda-Grubbs 2 | 1000 (5. Min) | N/A | N/A | N/A | 5000 (<1 min) | 10,000 (5 hr) | 20,000 (8 min) |

Thus, specific embodiments, methods of producing and using olefin metathesis active catalyst species have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A ruthenium olefin metathesis catalyst, comprising the formula:

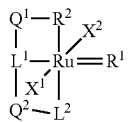

wherein $L^1$ is an oxygen atom and $L^2$ is a pyridyl ligand or a substituted pyridyl ligand;

$X^1$ and $X^2$ are chlorine;

$R^1$ alkylidene ligand $CH_2$, vinylidene ligand, allenylidene ligand, or indenylidene ligand;

$R^2$ is a carbene ligand; and $Q^1$ is phenylene and $Q^2$ fis ethylene (-$CH_2$-$CH_2$-), or substituted ethylene.

2. A ruthenium olefin metathesis catalyst, comprising the formula:

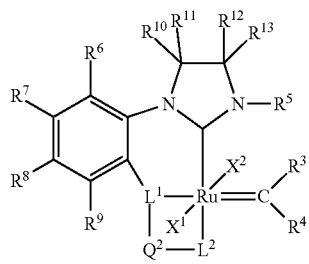

Wherein $L^1$ is an oxygen atom and $L^2$ is a pyridyl ligand or a substituted pyridyl ligand;

$X^1$ and $X^2$ are chlorine;

$R^3$, $R^4$ are hydrogen, and $R^5$, $R^6$, $R^7$, $R^8$, $R^9$, $R^{10}$, $R^{11}$, $R^{12}$, and $R^{13}$ are independently selected from hydrogen, functional groups, hydrocarbyl, substituted hydrocarbyl, heteroatom-containing hydrocarbyl, or substituted heteroatom-containing hydrocarbyl; and $Q^2$ is selected from ethylene (-$CH_2$-$CH_2$-), substituted ethylene, and phenylene.

* * * * *